United States Patent
Iwaizono et al.

(10) Patent No.: US 6,524,739 B1
(45) Date of Patent: Feb. 25, 2003

(54) SECONDARY BATTERY

(75) Inventors: Yoshinori Iwaizono, Okayama (JP);
Kenjin Masumoto, Nishinomiya (JP);
Seiichi Mizutani, Hirakata (JP);
Katsuhiko Mori, Hirakata (JP);
Tomiya Ishimaru, Akaiwa-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/529,403
(22) PCT Filed: Aug. 25, 1998
(86) PCT No.: PCT/JP99/04599

§ 371 (c)(1),
(2), (4) Date: Apr. 24, 2000

(87) PCT Pub. No.: WO00/11737

PCT Pub. Date: Mar. 2, 2000

(30) Foreign Application Priority Data

| Aug. 25, 1998 | (JP) | 10-238324 |
| Nov. 13, 1998 | (JP) | 10-323643 |
| Jun. 11, 1999 | (JP) | 11-165480 |

(51) Int. Cl.[7] ........................ H01M 2/00; H01M 14/00; H01M 2/08
(52) U.S. Cl. ............... 429/61; 429/7; 429/185
(58) Field of Search .............. 429/7, 8, 58, 61, 429/62, 175, 185

(56) References Cited

U.S. PATENT DOCUMENTS

| 4,855,195 A | 8/1989 | Georgopoulos et al. |
| 5,307,519 A | * 4/1994 | Mehta et al. ............... 455/343 |
| 5,508,126 A | * 4/1996 | Braun ............................ 429/7 |
| 5,599,636 A | * 2/1997 | Braun ............................ 429/7 |
| 5,750,277 A | 5/1998 | Vu et al. |
| 5,976,720 A | * 11/1999 | St. Jean et al. .................. 429/7 |
| 6,146,788 A | * 11/2000 | Ikeda et al. .................. 429/160 |
| 6,177,209 B1 | * 1/2001 | Okutoh ........................ 429/62 |

FOREIGN PATENT DOCUMENTS

| EP | 0849815 | 6/1998 |
| FR | 2635919 | 3/1990 |
| JP | 2-78151 | 3/1990 |
| JP | 8-31460 | 2/1996 |
| JP | 10275612 | 10/1998 |

OTHER PUBLICATIONS

English Language Abstract of JP 10–275612.
English Language Abstract of JP 8–31460.

* cited by examiner

*Primary Examiner*—Tom Dunn
*Assistant Examiner*—Zidia Pittman
(74) *Attorney, Agent, or Firm*—Greenblum & Bernstein, P.L.C.

(57) ABSTRACT

A protective circuit having an electronic circuit constructed on a circuit board is built into a sealing member that seals the open end of a battery case accommodating electricity generating elements. The circuit board is attached to the outer end of the sealing member. A positive terminal plate that becomes the positive terminal of the secondary battery and an S pole terminal plate that controls the operation of the electronic circuit by an external connection are provided on the outer surface of the circuit board. Thereby, a protective circuit that prevents over-discharging and overcharging is arranged inside the sealing member. A secondary battery is thereby constructed with a protective circuit without resorting to a construction of a battery pack.

37 Claims, 32 Drawing Sheets

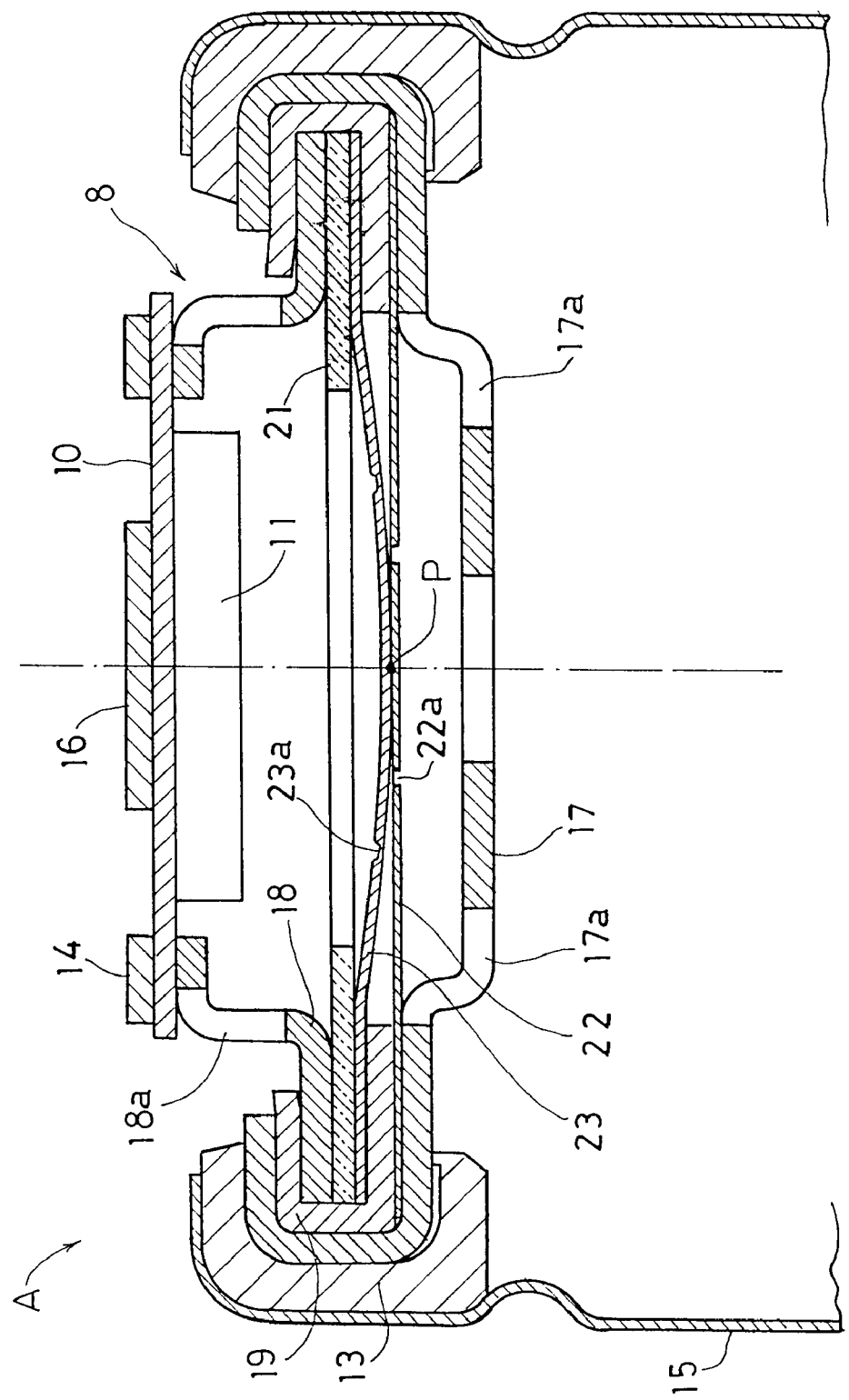

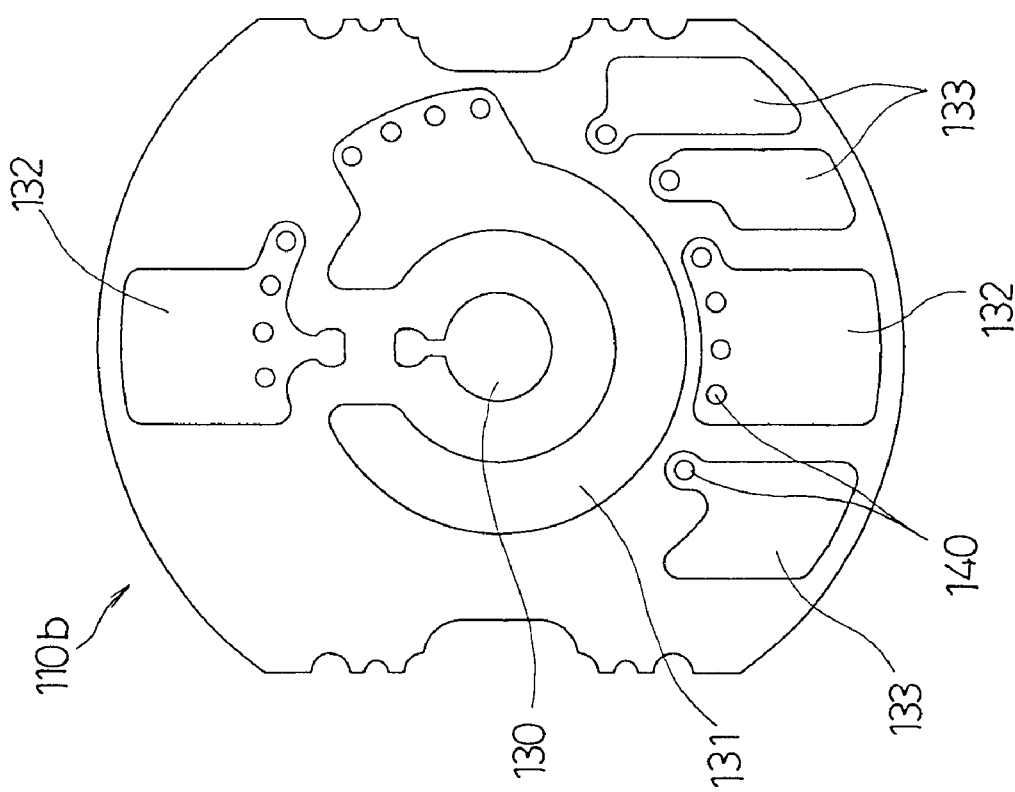
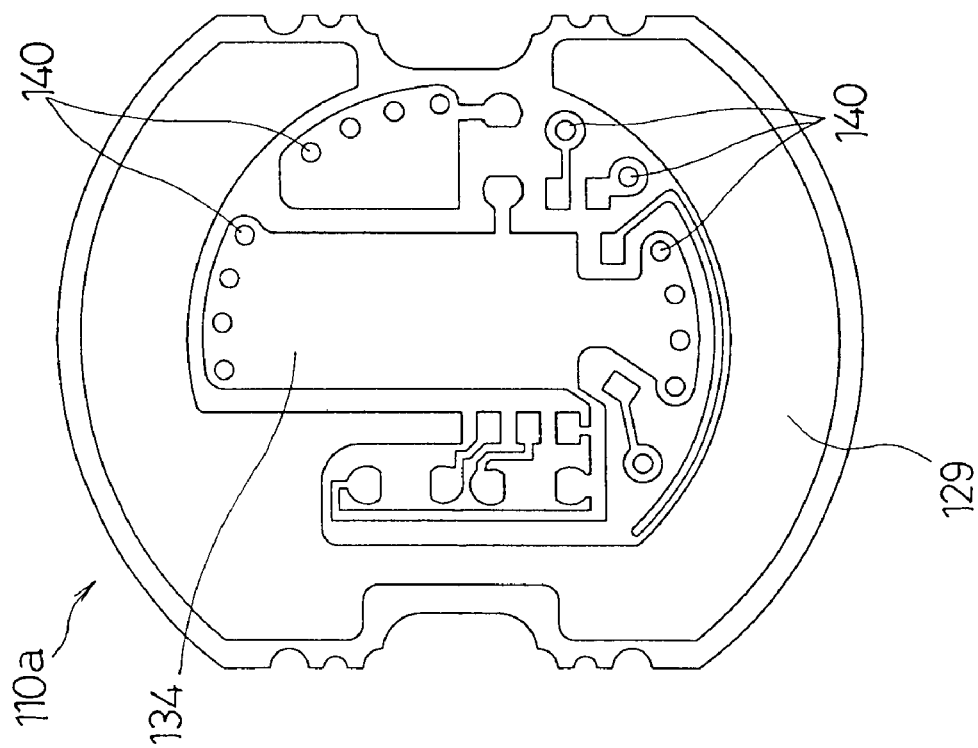

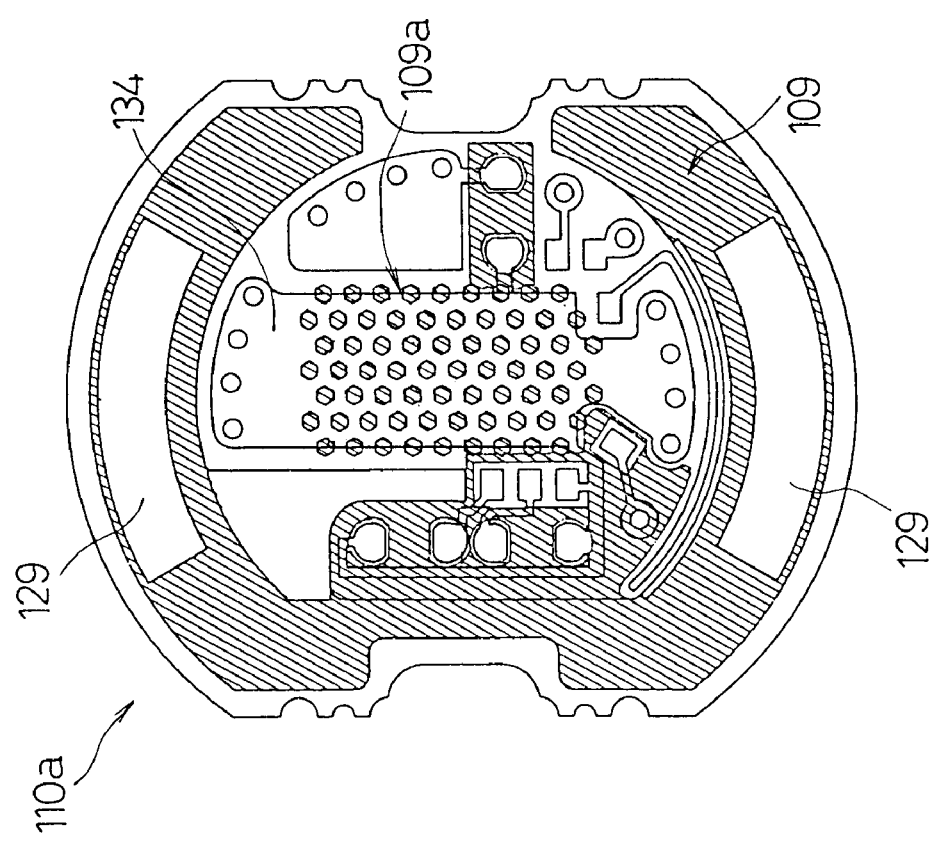
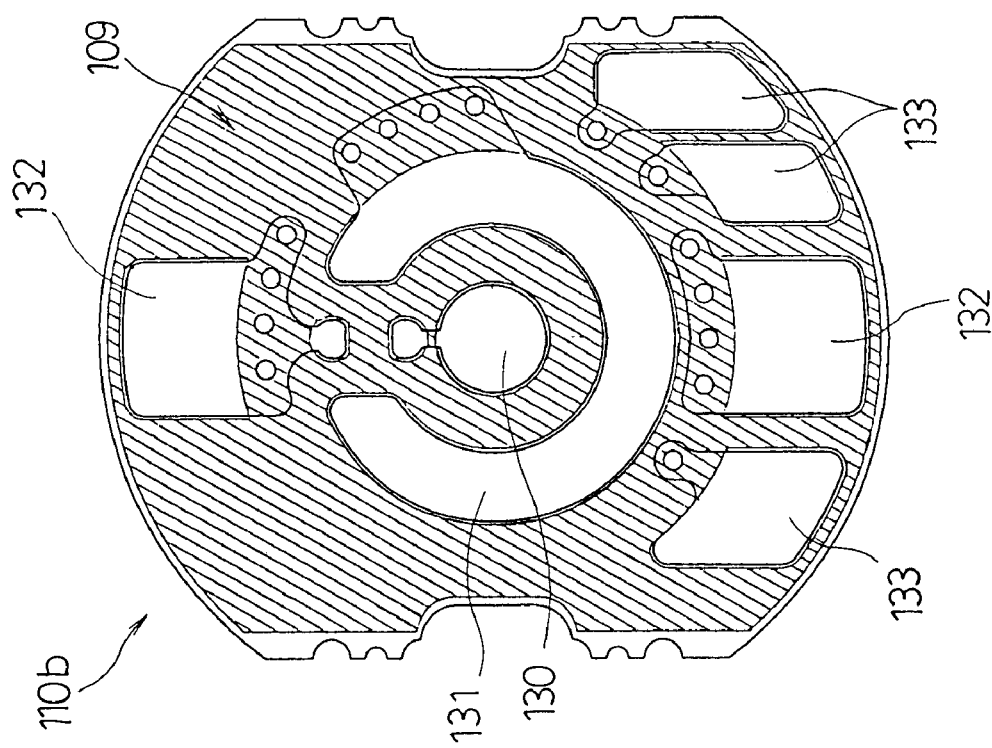
Fig. 20A
Fig. 20B

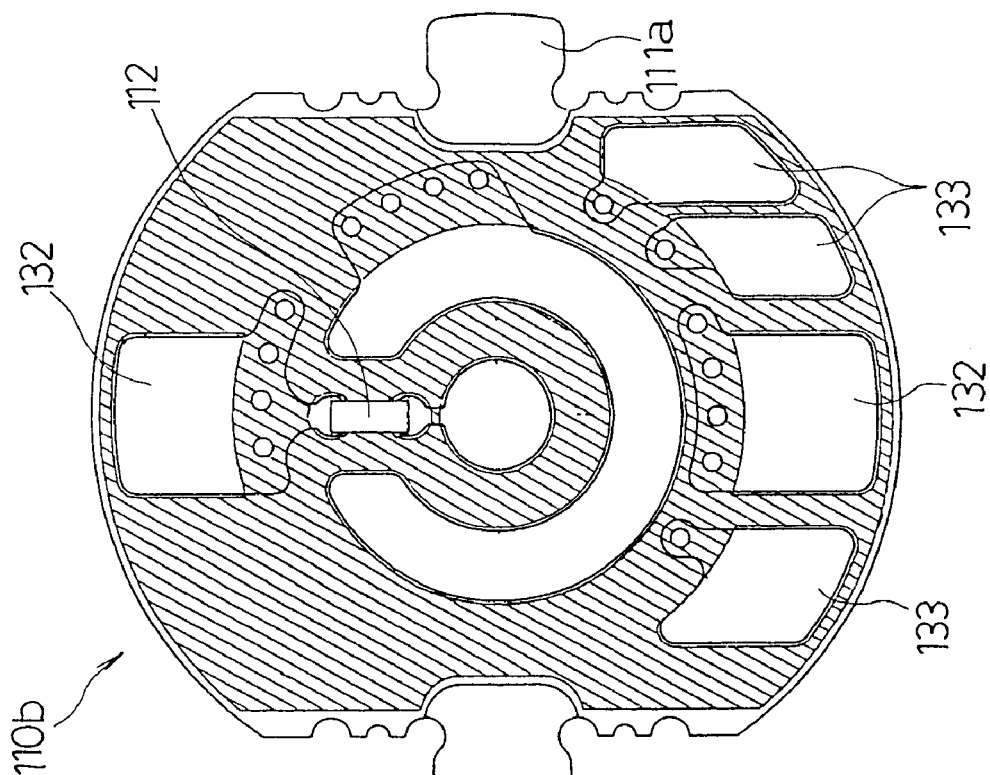
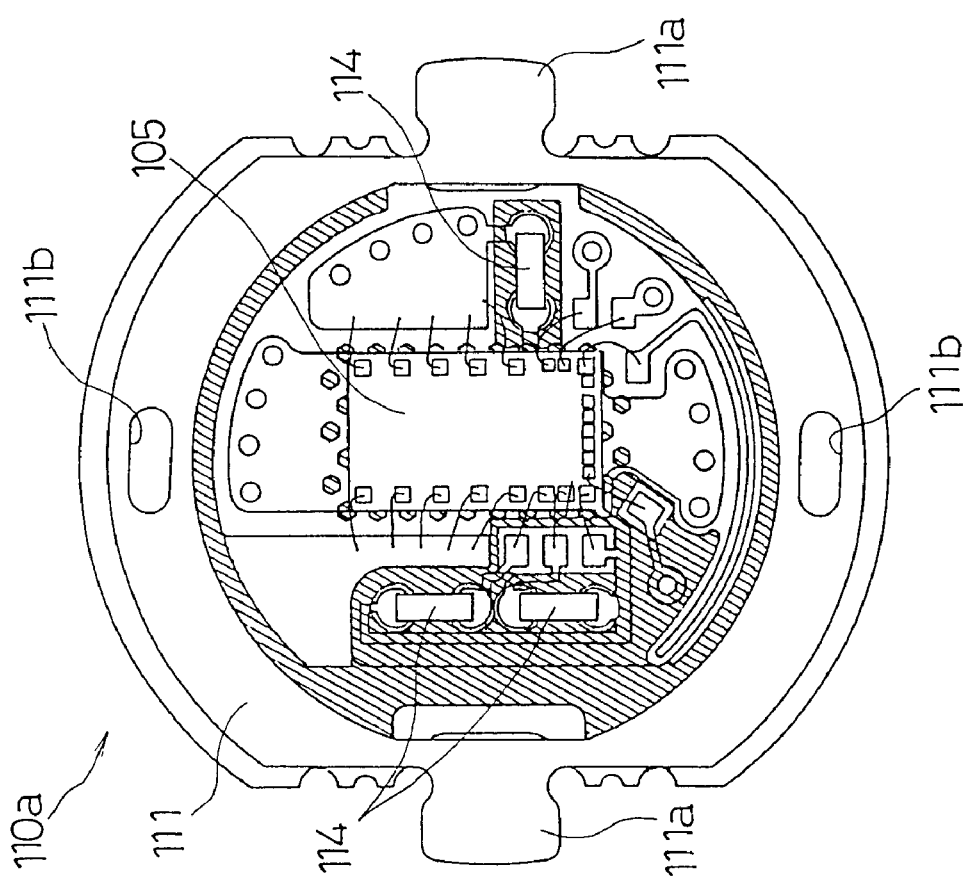

SECONDARY BATTERY

TECHNICAL FIELD

The present invention relates to a secondary battery such as a lithium ion secondary battery, which is provided with a battery protection device inside of the battery and which has thereby functions for protecting the battery from overcharging and over-discharging, etc., in the battery itself.

BACKGROUND ART

Various kinds of protective features are built into secondary batteries in order to protect against shorts in battery peripheral circuits in equipment wherein such secondary batteries are used, against shorts between positive and negative electrodes, and against battery damage resulting from abnormal usage as in overcharging or over-discharging. These include PTC elements for blocking excessive discharge currents caused by shorts and the like, and safety valves and the like which interrupt the conducting circuit by the anomalous rises in internal battery voltage associated with overcharging and release that internal voltage. These protective features are commonly known as features wherewith the secondary battery itself is provided. In lithium ion secondary batteries, moreover, protective circuits are provided for preventing overcharging and over-discharging. These protective circuits are generally contained inside a battery pack case and integrated with the lithium ion secondary battery. As well known, such battery pack constructions wherein the battery and the protective circuit are accommodated and integrated in a case are widely used as battery power supplies in portable telephone instruments and mobile computers, etc., that use lithium ion secondary batteries.

The protective circuits described above can also incorporate excessive current interrupting features and battery temperature monitoring features and the like in addition to features for preventing overcharging and over-discharging as described in the foregoing. If these features can be built into the secondary battery itself, it will be no more necessary to construct the battery pack and secondary batteries with protective circuits can be provided for general purposes. Japanese Laid-Open Patent Application No. 8-31460 discloses a battery which is though to have been developed for the purpose of accommodating a protective circuit inside the battery. In this art, a protective circuit and other constituent elements are arranged in an upper part of the battery, and the protective circuit, and the battery, are accommodated inside an outer case. Thus it is nothing different from the conventional battery pack construction. What is demanded in a secondary battery provided with a protective circuit is one which has roughly the same dimensions and shape as a conventional secondary battery having no- protective circuit, with the protective circuit accommodated inside that battery case.

The inventors of the present invention developed a secondary battery having a protective circuit accommodated inside the battery, along the lines described in the foregoing, and proposed that secondary battery in Japanese Laid-Open Patent Application No. 8-178896. One embodiment thereof is diagrammed in FIG. 37. Therein, a battery protection device containing the protective circuit described earlier is arranged in a sealing member 90 that seals the open end of a battery case accommodating electricity generating elements.

The battery protection device within the sealing member 90 comprises a circuit board constituting an electronic circuit 77 forming a protective circuit, a PTC element 72 that is a critical temperature resistor for blocking excessive currents such as occur with shorts, etc., and a current interrupting mechanism 73 that interrupts the conducting circuit by breaking when the voltage inside the battery rises abnormally thereby to release the abnormal internal voltage. The positive terminal of the electricity generating elements is connected to the circuit board through the current interrupting mechanism 73 and the PTC element 72, and electrical connections are effected from the circuit board to a positive terminal cap 75 that constitutes the positive terminal of the battery, and to an S pole cap 76 that is for externally connecting the minus side of the electronic circuit 77.

The construction described in the foregoing is diagrammed in schematic form in FIG. 38. The electronic circuit 77 is made up of a battery protection IC 80 comprising overcharging and over-discharging control functions, and an FET 81 for turning on and off the conducting circuit on the positive terminal side by control signals from the battery protection IC 80. The negative terminal side of this electronic circuit 77 is electrically connected to the S pole cap 76. Therefore, when this secondary battery is installed in equipment wherein it is used or in a charger, an electrical connection is effected across the S pole cap 76 and a battery case 83 constituting the negative terminal of the secondary battery, thereby putting the electronic circuit 77 in an operating state. When this secondary battery is not installed in equipment, no power consumption arises because of the electronic circuit 77, although it is very slight. As diagrammed, the current interrupting mechanism 73, PTC element 72, and electronic circuit 77 are arranged in series in the conducting circuit on the positive terminal side from the electricity generating elements 78. Thus the secondary battery is equipped with three levels of battery protection features.

However, when the resistance value of the PTC element 72 secured by caulking inside the sealing member 90 rises by self-heating due to excessive currents, the cubic volume thereof expands when a tripped state is reached. When this cycle of expansion and return to normal is repeated again and again, the caulking becomes loosened so that a very small gap develops, leading to the problem of electrolyte leaking out through the gap.

There is also another problem in that, because the circuit board is arranged in proximity to the current interrupting mechanism 73, limitations are placed on the space available for deformation of the current interrupting mechanism 73 which will deform and rupture due to abnormal rises in the internal battery voltage, making it difficult to obtain deformation/rupture precision.

An object of the present invention is to provide a secondary battery wherein a battery protection device comprising a protective circuit is accommodated inside the battery, wherewith there is but slight change in the size of the battery, and wherewith battery performance is not compromised.

DISCLOSURE OF THE INVENTION

A first aspect of the present invention is a secondary battery wherein electricity generating elements are accommodated inside a battery case formed in a cylindrical shape having a bottom, the open end of the battery case being sealed by a sealing member having a battery protection device built therein, characterized in that the battery protection device comprises a protective circuit, for protecting the battery from overcharging and over-discharging, consisting of an electronic circuit formed on a circuit board, the circuit board being arranged in the sealing member such that an electrode terminal formed in one side thereof is exposed to the outside.

According to this construction, the protective circuit is built into the secondary battery itself, in which the protective circuit is arranged inside the sealing member, and the electrode terminal passed through the electronic circuit forming this protective circuit is attached so that it is externally exposed. Thus the secondary battery is constructed with a protective circuit without resorting to the construction of a battery pack. Battery damage caused by equipment malfunction or abnormal use is prevented by the features provided in this protective circuit for preventing overcharging, over-discharging, and excessive discharge current, etc.

A second aspect of the present invention is a secondary battery wherein electricity generating elements are accommodated inside a battery case formed in a cylindrical shape having a bottom, the open end of the battery case being sealed by a sealing member having a battery protection device built therein, characterized in that the battery protection device comprises a protective circuit, for protecting the battery from overcharging and over-discharging, consisting of an electronic circuit formed on a circuit board, the circuit board being arranged in the sealing member such that an electrode terminal formed in one side thereof is exposed to the outside, and a current interruption means for interrupting a conducting circuit when the internal battery voltage rises abnormally and for discharging the internal voltage.

According to this construction, the protective circuit is built into the secondary battery itself, by arranging the protective circuit and current interruption means inside the sealing member. Thus the secondary battery is constructed with a protective circuit without resorting to the construction of a battery pack. Furthermore, since the conducting circuit is interrupted by the current interruption means even when the protective circuit is damaged, battery damage caused by equipment malfunction or abnormal use is prevented.

A third aspect of the present invention is a secondary battery wherein electricity generating elements are accommodated inside a battery case formed in a cylindrical shape having a bottom, the open end of the battery case being sealed by a sealing member having a battery protection device built therein, characterized in that the battery protection device comprises a protective circuit, for protecting the battery from overcharging and over-discharging, consisting of an electronic circuit formed on a circuit board, the circuit board being arranged in the sealing member such that an electrode terminal formed in one side thereof is exposed to the outside, an excessive current blocking means for blocking current conduction when excessive current is discharged such as when there is a short, etc., and a current interruption means for interrupting the conducting circuit when the internal battery voltage rises abnormally and for discharging the internal voltage.

According to this construction, threefold battery protection features are built into the secondary battery itself, by providing a protective circuit, excessive current blocking means, and current interruption means inside the sealing member. Thus the secondary battery itself can be provided with a battery protection device without resorting to the construction of a pack battery or the like.

In the construction described above, the excessive current blocking means can employ a PTC which heats by excessive current and restricts discharge of the current by a rapid increase in the resistance value.

Furthermore, when a feature for detecting and interrupting excessive current is constructed in the protective circuit, the PTC can be eliminated, in which case a metal ring can be arranged in place of the PTC.

The circuit board constituting the protective circuit comprises a positive electrode terminal of said battery formed in center portion on one surface side, an externally connecting electrode terminal that becomes a grounding site in said protective circuit formed in peripheral portion on said one surface side, a positive terminal connecting electrode connecting to positive terminal of electricity generating elements formed in peripheral portion of other surface side, and through holes provided at prescribed positions for making connections between said one surface side and said other surface side. The other side of the circuit board is arranged so that it is exposed to the outside from the sealing plate, wherefore the positive electrode terminal functions as the positive terminal of the secondary battery. The protective circuit is activated by connecting the externally connecting electrode terminal to the battery case. that forms the negative terminal.

The electrode terminals can be constituted by mounting metal plates on a conductor pattern on the circuit board by solder welding or with a conductive adhesive. Welding of such metal plates facilitates electrical connection of the secondary battery to the equipment side.

Further, the metal plate, which is bonded to the positive electrode terminal, may be formed with a projection in the central portion on the outer side thereof, so as to achieve better contact connection with the connecting terminals on the equipment. This can also improve weldability of leads when joining them thereto because of the concentration of welding current toward the projection in resistance welding.

Moreover, by forming the metal plate from nickel plate, or gold-plated metal plate, or metal plate of the same material as the battery case, the ability to withstand repeated contact can be enhanced in the case of the nickel plate, outstanding corrosion resistance can be effected in the case of the nickel plate or gold-plated metal plate, and a reduction in contact resistance can be realized with the gold-plating. By employing the same material as the battery case, the welding conditions in resistance welding also become easier when effecting series connections.

The circuit board is supported by a supporting member that is electrically connected to the positive terminal of the electricity generating elements and secured inside the sealing member on the outer circumferential side, so that this supporting member and the positive terminal connecting electrode make contact on the inner circumferential side thereof. Further, the supporting member and the positive terminal connecting electrode are bonded together, by soldering or an electrically conductive adhesive. Thereby, electrical connection to the protective circuit is made simultaneously with the attachment to the sealing member of the circuit board.

A circuit board positioning projection may be provided on the supporting member, whereby not only will the process of attaching to the circuit board be made easier, but positioning in the connecting position will also be made easy.

Furthermore, by covering the electronic circuit portion of the protective circuit with a resin, the moisture resistance of the electronic circuit portion and resistance to corrosion from the electrolyte components can be enhanced.

Furthermore, by providing an electrically conducting member for making an electrical connection between the battery case constituting the negative terminal of the battery and the externally connecting electrode terminal on the circuit board, the protective circuit is constantly kept in an energized state. Accordingly, connecting members and other constituent elements for connecting the externally connecting electrode terminal to the negative terminal when the battery is installed in equipment can be eliminated. Self-discharge loss caused by always conducting current in the protective circuit during prolonged storage is not a problem because, as with conventional battery pack constructions, the battery will be charged prior to use in the equipment, either by the equipment or with a charger.

The electrically conducting member described above may be provided with openings in the peripheral portion and center portion of the bottom surface, and formed in the shape of a cylinder having a bottom with an inner diameter that will fit onto the open end of the battery case. By fitting it to the open end of the battery case, electrical connection can be effected between the externally connecting electrode terminal on the circuit board, so that a stabilized fitting condition is realized. By joining the electrically conducting member and the externally connecting electrode terminal by soldering or an electrically conductive adhesive, the electrical connection can be made more stable.

It is preferable to form the electrically conducting member of a resilient metal material, or of a metal material exhibiting outstanding weldability with the battery case, or of the same metal material as the battery case. With the resilient metal material, the electrically conducting member can be pressed against the battery case and the electrical connection is stabilized. When the electrically conducting member and the battery case are joined by welding, it is beneficial to use a metal material having outstanding weldability. If the same metal material as the battery case is used, weldability will also be assured.

The electrically conducting member can be formed so that the surface portion of the bottom surface thereof, excluding the peripheral portion thereof, is given an insulating coating. While the peripheral portion of the bottom surface functions as a minus electrode terminal, and together with the positive electrode terminal as seen from the opening in the center portion, positive and negative input/output terminals can be provided in surfaces in the same direction in the battery. The battery connection structure of the equipment is thereby simplified. The insulating coating noted above functions as an insulating portion between these positive and negative terminals.

Alternatively, a connecting member joined to the externally connecting electrode terminal may be provided, this being electrically connected to the open end of the battery case, to which the sealing member is secured by caulking. The externally connecting electrode terminal can thereby be connected to the battery case without using an electrically conducting member.

A securing member is secured inside the sealing member together with a supporting member on an outer circumferential side thereof, and faces said supporting member on an inner circumferential side thereof, with the circuit board being interposed therebetween, and said securing member and said supporting member are fastened together at a plurality of positions in a peripheral portion of said circuit board with fastening means. By providing such a construction, the peripheral portion of the circuit board will be held from both sides, wherefore a strong securing structure can be obtained.

The fastening means can be formed by resin rivets, of which ends are passed through the supporting member, circuit board, and securing member and are melt-molded. Since fastening is done using insulating resin rivets, both sides of the circuit board can be fastened with reliable electrical insulation therebetween.

The fastening means can be formed with metal members that are passed through the securing member and the circuit board with an intervening insulating material and secured to the supporting member. The circuit board can thereby be attached to the sealing member after securing the sealing member to the battery case, and the process of caulking the sealing member to the battery case can be performed easily.

Openings are formed in a prescribed constituent member of the sealing member, which openings open toward the exterior in a direction perpendicular to the cylinder direction of the battery case. When gas pressure that has abnormally risen inside the battery is exhausted, the danger of the battery flying out in conjunction with the exhausting of the gas can be prevented because the openings are formed in a direction perpendicular to the gas blowout.

The surface of the battery case is coated with an insulating coating that leaves an exposed surface larger than the outer dimensions of the positive electrode terminal in the center portion of the bottom surface, and an exposed surface at a prescribed circular place in the lateral circumferential surface. The insulating coating on the bottom surface functions as an insulating layer with another battery when connected in series, and the exposed surface in the circular place can effect a minus connection to the battery case in the lateral circumferential surface.

A recessed part having a diameter larger than the external dimensions of the positive electrode terminal may be formed in the center portion of the bottom surface of the battery case. That way, when batteries are connected in series, the positive electrode terminal of the other battery will fit into the recessed part and be held in position.

A fourth aspect of the present invention is a secondary battery wherein electricity generating elements are accommodated inside a battery case formed in a cylindrical shape having a bottom, an open end of said battery case being sealed with a sealing member comprising a battery protection device therein, characterized in that: a circuit board having a protective circuit constructed on an inner surface side thereof for protecting battery from overcharging and over-discharging, is arranged in an outermost part of said sealing member; a positive input/output terminal connected via said protective circuit to a positive terminal plate is joined to an outer surface side of said circuit board, in center portion thereof; and an outer cap which covers a peripheral portion of said circuit board is fit onto said battery case and joined thereto.

According to this construction, the secondary battery has a circuit board constituting a protective circuit arranged in the sealing member, and the positive terminal plate of the secondary battery is connected to the positive input/output terminal through the protective circuit. Therefore the secondary battery is protected from overcharging and over-discharging, etc., by the protective circuit. There is no need to construct a battery pack in which the secondary battery and the protective circuit are accommodated inside a pack case. The provision of a protective circuit is an essential requirement for lithium ion secondary batteries, and if the secondary battery itself can have the protective circuit, it can be widely used for general purposes. Moreover, the equipment employing the batteries can be constructed compactly.

In the construction described in the foregoing, a temperature detector terminal is provided on the outer surface side of the circuit board, and a temperature detector element for detecting the temperature of the protective circuit and the battery, connected thereto, is provided, so that the temperatures of the protective circuit and battery are output to the temperature detector terminal. Hence the equipment using the battery or a charger can detect the battery temperature condition from the temperature detector terminal, whereby utilization at proper temperatures can be realized.

The sealing member comprises a current interruption means formed in a disk shape, a PTC formed in a circular ring shape, and an inner cap formed in a cap shape open in the center portion, stacked together, respectively having the outer circumferential portions thereof sandwich-secured by the outer circumferential portion of the sealing bottom plate with an intervening inner gasket. A spot ring attached to the circuit board is joined to the apex of the inner cap, thus providing a protective circuit. The sealing member is secured by caulking to the open end of the battery case with an intervening outer gasket. Thereby, the current interruption means, the PTC for blocking excessive discharge currents, and the protective circuit can be constructed inside the sealing member. Thus safety is enhanced when the secondary battery is abnormally used or the equipment malfunctions, by means of a plurality of battery protection devices.

The spot ring is attached to the circuit board by joining the ring-shaped surface to the conductor pattern formed on the circuit board. The circuit board is secured to the top of the inner cap by joining to the inner cap a joining surface of the spot ring that protrudes from the ring-shaped surface to the outside of the circuit board. Thereby the attachment operation of arranging the circuit board in the sealing member can be performed easily.

The spot ring should preferably be formed of a copper-nickel alloy or of a clad metal containing a copper-nickel alloy, which exhibits superior weldability, electrical conductivity, and corrosion resistance.

An IC component is mounted on an IC heat-radiating conductor pattern formed on the inner surface side of the circuit board. A negative terminal connecting conductor pattern on the outer surface side to which the outer cap is joined and the IC heat-radiating conductor pattern are connected by through holes. A temperature detector element is arranged between the negative terminal connecting conductor pattern and a temperature detector element connecting conductor pattern. Heat from the IC component is conveyed from the IC heat-radiating conductor pattern to the negative terminal connecting conductor pattern, and the heat in the battery case is also conveyed from the outer cap to the negative terminal connecting conductor pattern. Therefore the temperature detector element connected to the negative terminal connecting conductor pattern will be changed by the heat from the IC component and the battery case. Changes in this temperature detector element can be detected from the temperature detector terminal joined to the temperature detector element connecting conductor pattern, wherefore the IC component and the battery can be used at suitable temperatures.

A solder resist is arranged at prescribed places excluding critical parts of the circuit board, such that the solder resist is arranged in a plurality of island-shaped patterns arrayed in the positions of the IC component on the IC heat-radiating conductor pattern. The IC component is mounted on the island-shaped patterns by filling the island-shaped solder resist array intervals with a adhesive. That way, the IC component can be insulated from the conductor pattern by the solder resist, and, since the area of the solder resist of low thermal conductivity is small, the heat from the IC component can be conveyed to the IC heat-radiating conductor pattern by the adhesive filled therebetween.

The island-shaped solder resist may be arranged such that the sides of hexagonal island-shaped patterns are aligned in parallel at a prescribed interval. The island-shaped patterns can thereby be arranged uniformly, thus obtaining suitable adhesive filling spaces therebetween.

The temperature detector terminal and the positive input/output terminal can be formed in a metal part wherein said temperature detector terminal in center thereof and positive input/output terminal formed so as to surround said temperature detector terminal at an interval are coupled and integrated by a thin bridge by metal molding, the interval between said temperature detector terminal and said positive input/output terminal being filled with an insulating resin to join both together, after which said bridge is cut away to form a coupled and integrated complex terminal. The temperature detector terminal and the positive input/output terminal can be constructed as an integrated complex terminal insulated by the insulating resin, and the attachment to the circuit board can be performed simultaneously.

The temperature detector terminal can be formed so that the apex thereof is positioned lower than the positive input/output terminal. When temperature detection is performed by separate means, by connecting a plate-shaped connector to the positive input/output terminal, provision can be made so that the temperature detector terminal is not used. Also, when this secondary battery is connected in series and constructed in a battery pack, temperature detection means can be provided as a battery pack, the positive input/output terminal can be made to conduct by contact with the bottom of the battery case, and the temperature detector terminal can be disabled.

The outer cap may be formed, of metal material, in a cylindrical shape having a bottom, provided with a cylindrical part that fits with the circumferential side surface of the battery case and a bottom surface part open in the center part thereof. In the bottom surface part thereof, a negative terminal connecting piece that connects to a negative terminal connecting conductor pattern formed on the circuit board, a board clamping piece that presses the outer surface side of the circuit board, and an upper surface piece that is positioned at a lower height than the board-clamping piece are formed. A resin molded part is formed which covers the outer surface side of the circuit board, excluding the temperature detector terminal and the positive input/output terminal, exposing the negative terminal connecting piece and the upper surface piece. The battery case that is the negative input/output terminal can be connected to the circuit board and, together therewith, the peripheral portion of the circuit board positioned in the outermost part of the sealing member can be coated with the resin molded part to prevent damage to the circuit board.

When a ring-shaped rib is formed in the resin molded part, short prevention between the negative terminal connecting piece and the positive input/output terminal in the center portion is optimized.

The outer cap should preferably be formed of a metal material, using either a copper-nickel alloy or a clad metal containing a copper-nickel alloy, which exhibits outstanding weldability, electrical conductivity, corrosion resistance, and strength.

A metal ring can be provided in place of a PTC. Because it is possible to incorporate functions in the electronic circuit on the circuit board for detecting excessive currents and interrupting the conducting circuit, the PTC constituting excessive current blocking means can be eliminated. When the PTC is replaced by a metal ring, the problems caused by PTC expansion are done away with. By eliminating the PTC, furthermore, the resistance value of the conducting circuit is reduced, contributing to a decrease in the internal resistance of the battery.

DESCRIPTION OF THE DRAWINGS

FIG. 1 is a cross-sectional view of a secondary battery according to a first embodiment of the present invention;

FIG. 19 represents a conductor pattern formed on a circuit board, with FIG. 19A being a plan view of the inside surface side and FIG. 19B being a plan view of the outer surface side;

FIG. 20 represents a solder resist arranged on a circuit board, with FIG. 20A being a plan view of the inner surface side and FIG. 20B being a plan view of the outer surface side;

FIG. 21 represents the condition wherein an electronic component is mounted on a circuit board and attached by a spot ring, with FIG. 21A being a plan view of the inner surface side and FIG. 21B being a plan view of the outer surface side;

BEST MODE FOR CARRYING OUT THE INVENTION

The present invention is applied to cylindrical lithium ion secondary batteries in the embodiments described below. The drawings showing the battery construction are represented as cross-sections in the diameter direction on the side of the sealing plate that is a characteristic construction of the present invention. The construction of the interior of the battery case wherein the electricity generating elements are accommodated is not shown. It should be understood that the construction of the electricity generating elements is the same as in a common lithium ion secondary battery.

FIG. 1 shows a secondary battery A according to a first embodiment of the present invention. Electricity generating elements (not shown) are accommodated inside a cylindrical battery case 15 having a bottom. A sealing member 8 is secured to the open end side of this battery case 15 by a caulking process via an outer gasket 13, whereby the open end of the battery case 15 is sealed.

Figure 2A:
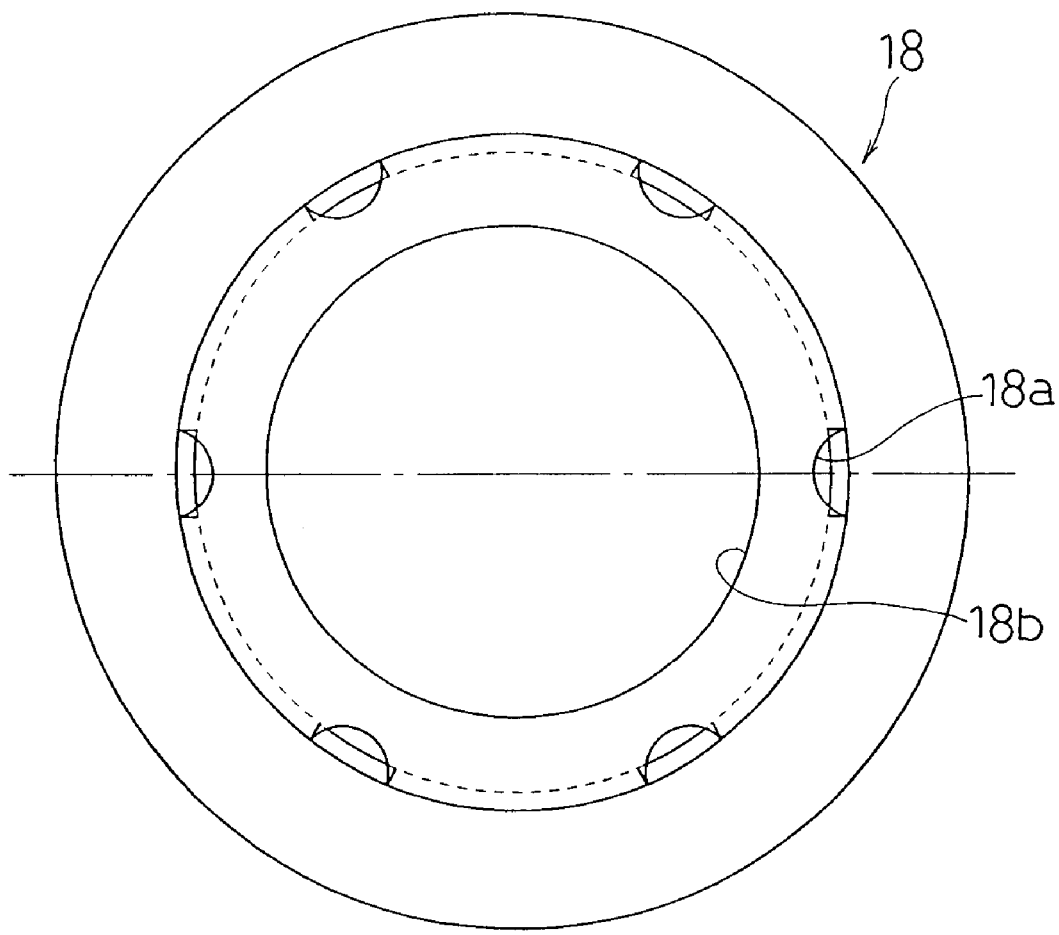
FIG. 2 represents the construction of a board support plate, with FIG. 2A being a plan view thereof and FIG. 2B being a side elevation view thereof.
Figure 2B:
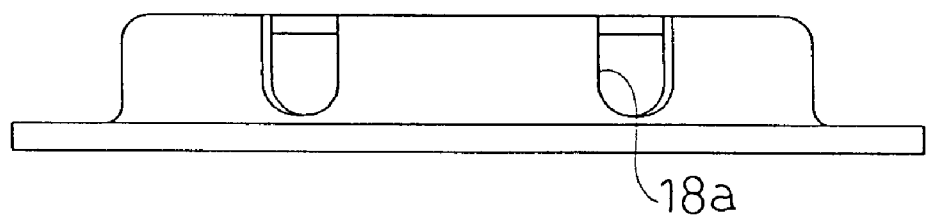

The sealing member 8 comprises, from the interior side of the battery, a sealing bottom plate 17, a lower thin metal plate 22 and upper thin metal plate 23 constituting current interruption means, a PTC element (excessive current blocking means) 21 that is a critical temperature resistor formed in a ring shape, a board support plate (supporting member) 18, and a circuit board 10 having an electronic circuit 11 forming a protective circuit constructed on the inner surface side thereof, in that order. The sealing member 8 is formed in a disk shape in order to seal the open end of the battery case 15 formed as a cylinder having a bottom, and the various constituent elements are also made circular. FIG. 2 represents the board support plate 18 that is one constituent element, in a plan (FIG. 2A) and side elevation (FIG. 2B). The board support plate 18 is formed in a cap shape provided with an open portion in the center, and with exhaust holes 18a formed at a plurality of locations in the rising part thereof. A flat portion formed in a ring shape about the periphery of the open portion 18b serves both to support the circuit board 10 and to constitute an electrically connecting part to the circuit board 10.

The lower thin metal plate 22, upper thin metal plate 23, PTC element 21, and board support plate 18 are stacked up at their respective peripheries and sandwich-secured by the peripheral portion of the sealing bottom plate 17 with an intervening inner gasket 19. The circuit board 10 is mounted on the board support plate 18 with the formed surface of the electronic circuit 11 facing toward the interior of the sealing member 8, and joined to the board support plate 18 by a joining method to be described later, thereby closing the upper open portion of the board support plate 18. Thus a battery protection device comprising current interruption means, excessive current blocking means, and a protective circuit is constructed inside the sealing member 8.

Figure 3A:
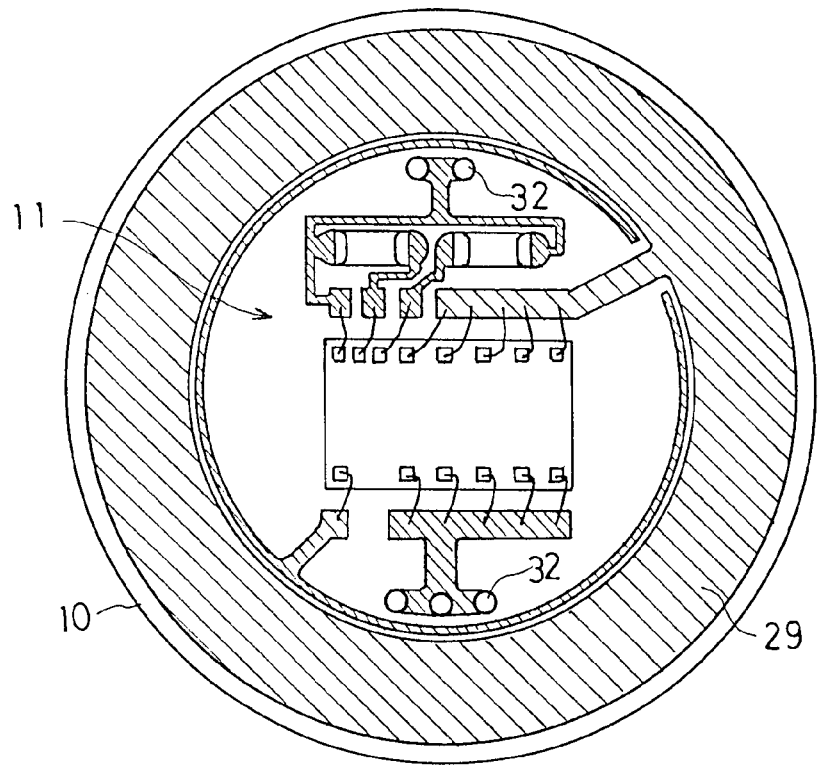
FIG. 3 represents the construction of a circuit board, with FIG. 3B being a plan view of one side and FIG. 3A being a plan view of the other side.
Figure 3B:
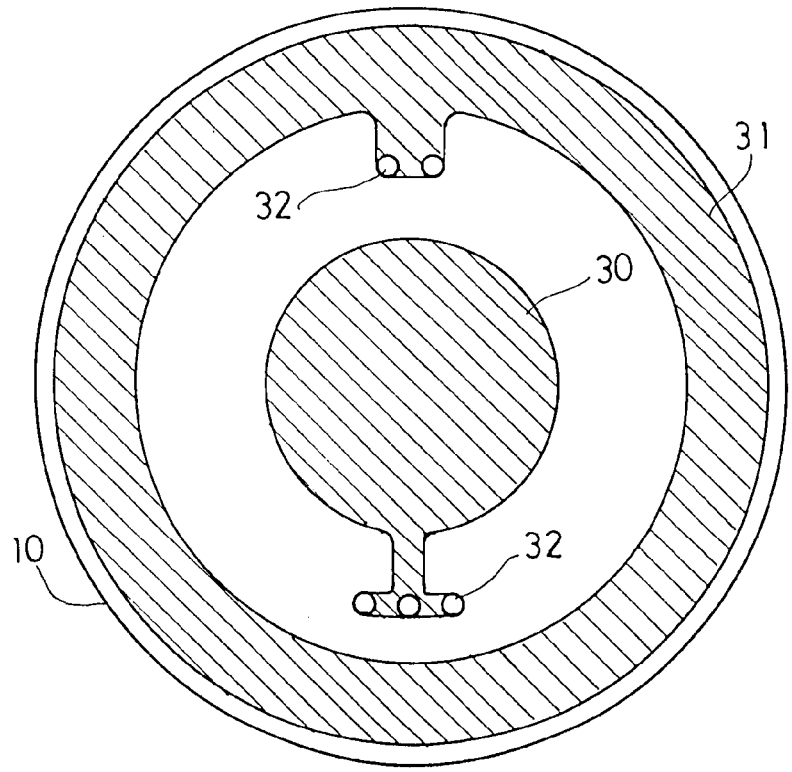

The circuit board 10, as diagrammed in FIG. 3A, has an electronic circuit 11 constructed in the center portion on the top surface side, facing toward the interior of the sealing member 8, and a positive terminal connecting conductor pattern (positive terminal connecting electrode) 29 formed in a ring shape in the peripheral portion thereof for electrically connecting to the board support plate 18. The center portion wherein the electronic circuit 11 is constructed, after the electronic components are mounted thereto, is coated with a resin by resin printing or resin molding to enhance the moisture resistance and corrosion resistance of the electronic circuit portion. On the bottom surface side facing toward the exterior of the sealing member 8, a positive terminal conductor pattern (positive electrode terminal) 30, is formed in the center portion thereof, and an S pole conductor pattern (externally connecting terminal) 31, in the peripheral portion thereof, is formed as diagrammed in FIG. 3B. Conducting connections are made by through holes 32, at desired locations, between the conductor patterns formed on the top surface and the bottom surface of the circuit board 10, thus constituting an electrical circuit wherein the one surface side and the other surface side are integrated.

The positive terminal connecting conductor pattern 29 comes into contact with the ring-shaped flat portion of the board support plate 18 when the circuit board 10 is mounted on the board support plate 18. These contacting surfaces are joined by soldering or an electrically conductive adhesive, so that the circuit board 10 is secured onto the board support plate 18, and an electrical connection is made between the board support plate 18 and the positive terminal connecting conductor pattern 29 of the circuit board 10.

Figure 4A:
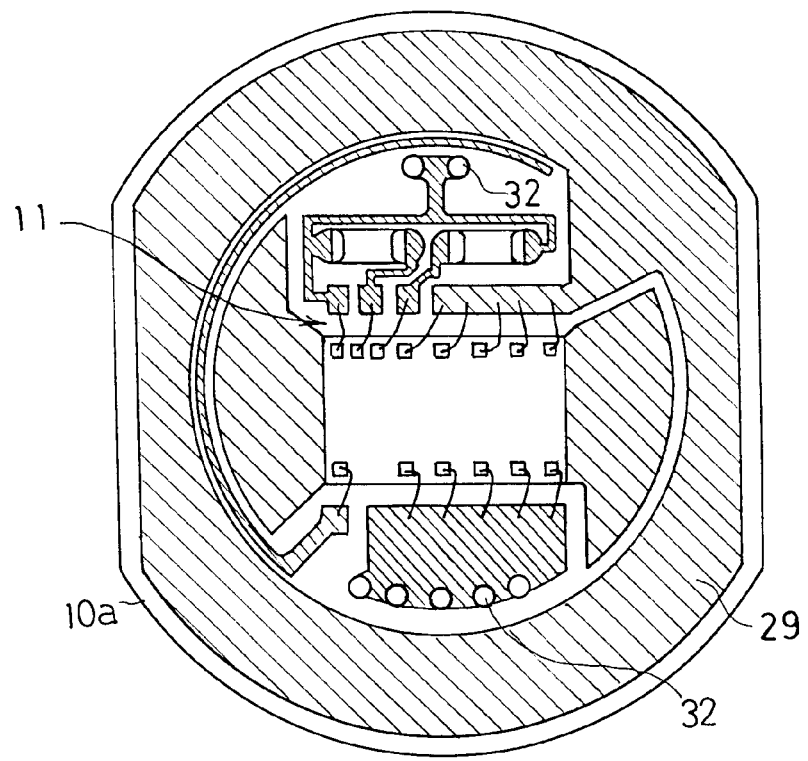
FIG. 4 represents an example modification of the circuit board, with FIG. 4B being a plan view of one side and FIG. 4A being a plan view of the other side.
Figure 4B:
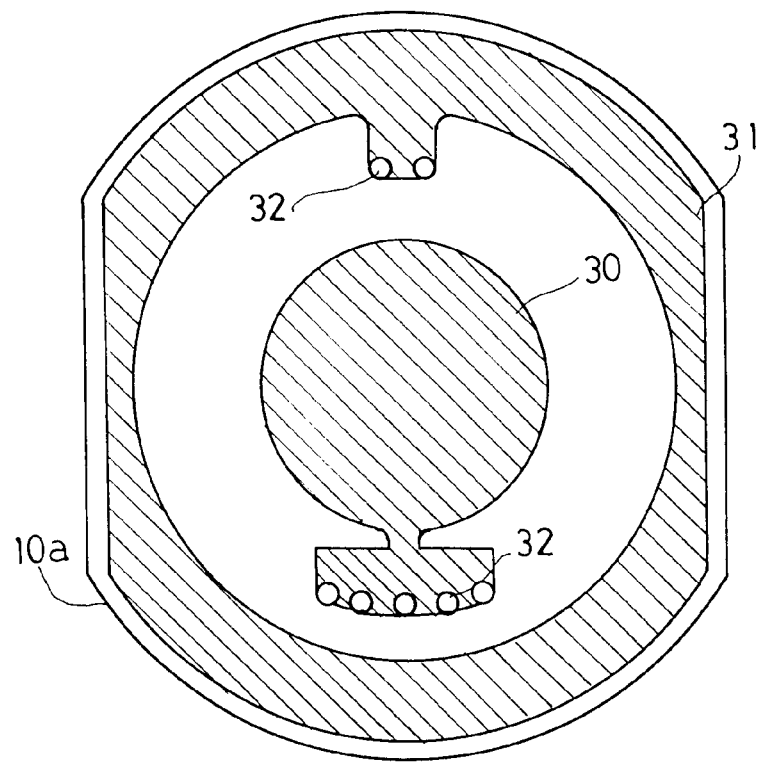

The circuit board 10 may be formed in a shape having opposing positions on a circle cut away as diagrammed in FIG. 4, denoted at 10a. By doing so, joining of the board support plate 18 and the positive terminal connecting conductor pattern 29 of the circuit board 10a mounted on the board support plate 18 can easily be made, by soldering or an electrically conductive adhesive. The electronic circuit 11 formed on the circuit board 10 or 10a can also be formed on the top surface and not only on the bottom surface of the circuit board 10 or 10a, depending on how the circuit is constructed.

Figure 5:
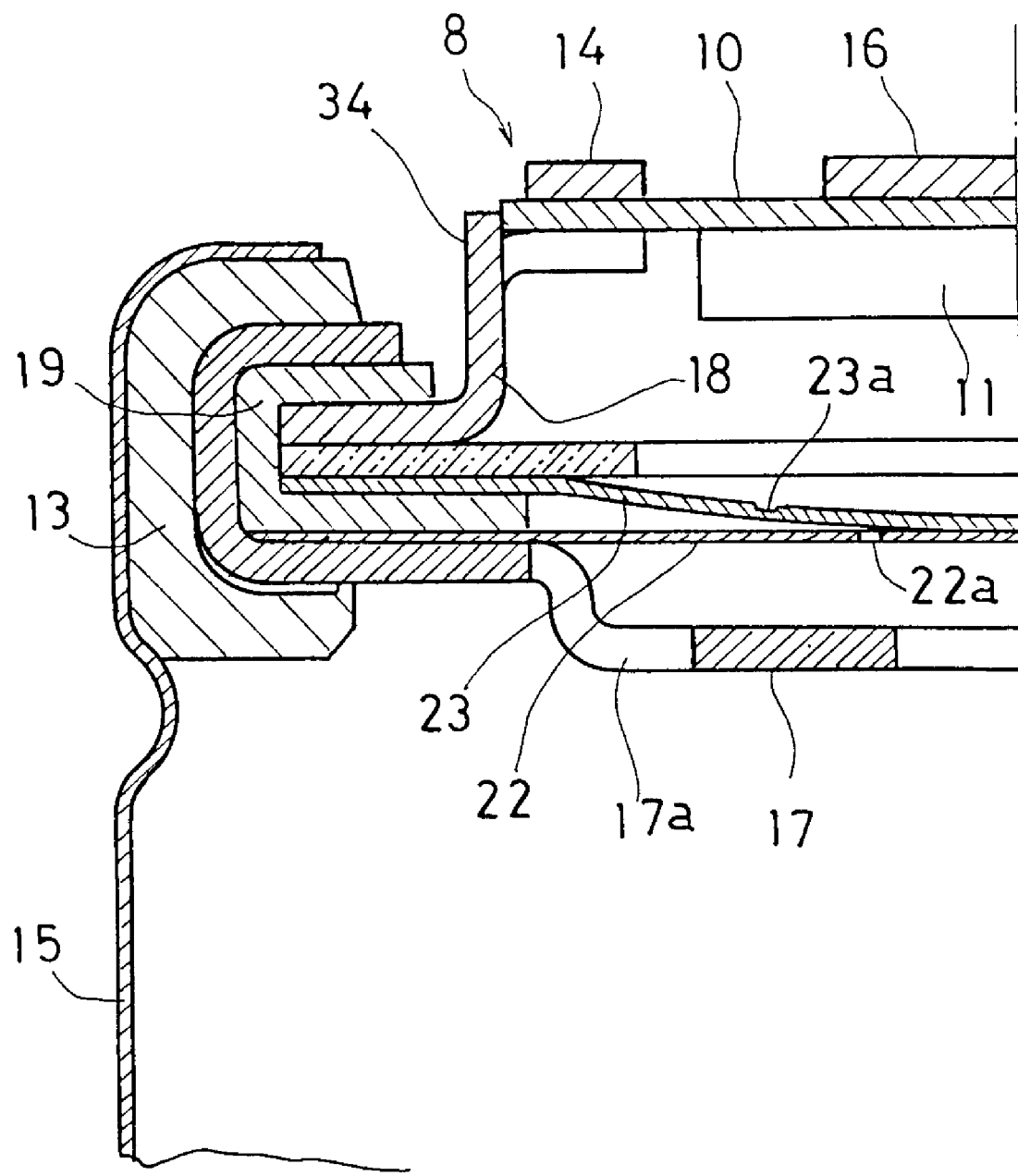
FIG. 5 is a cross-sectional view of an example modification of an upper sealing plate that supports the circuit board.

For attaching the circuit board 10 or 10a to the board support plate 18, raised portions (projections) 34 may be formed at prescribed locations surrounding the periphery of the board support plate 18, as diagrammed in FIG. 5. Positioning of the circuit board 10 at the right position for attachment to the board support plate 18 is thereby rendered easy, so that work efficiency during the assembly of the sealing member 8 can be enhanced.

Furthermore, a positive terminal plate (metal plate) 16 formed in a disk shape is joined to the positive terminal conductor pattern 30 by soldering or an electrically conductive adhesive, as diagrammed in FIG. 1. Further, an S pole terminal plate (metal plate) 14 formed in a ring shape is joined to the S pole conductor pattern 31, by soldering or an electrically conductive adhesive, as diagrammed in FIG. 1. These positive terminal plate 16 and S pole terminal plate 14 are formed of metal material exhibiting outstanding corrosion resistance and little contact resistance with the contact terminals on the equipment side. Pure nickel material or a gold-plated metal material can be used for this purpose. Also, the positive terminal plate 16 should preferably be formed of the same material as the battery case 15, whereby the welding conditions are made similar when effecting resistance welding between the same metal materials for connecting the batteries in series. Further, by providing a projection in the center portion of the positive terminal plate, the contact with the contact terminal on the equipment side is enhanced, and, when resistance-welding a connecting lead, weldability can be enhanced by the concentration of the welding current toward the projecting portion.

The positive terminal plate 16 and S pole terminal plate 14 are used as contact members or joining members when electrically connecting the secondary battery A to equipment, but it is also possible to use the conductor pattern on the circuit board 10 itself as a contact or joining member. If the circuit board 10 has a thickly-formed conductor pattern on it, direct connection to the conductor pattern is possible without joining a metal plate.

According to the construction described in the foregoing, the conducting circuit of the secondary battery A is constructed as follows. The negative terminal of the electricity generating elements accommodated inside the battery case 15 is connected to the battery case 15, and the battery case 15 constitutes the negative terminal of the secondary battery A. The positive terminal lead leading from the positive terminal of the electricity generating elements, on the other hand, is connected to the sealing bottom plate 17. The positive terminal conducting circuit is formed as a circuit that is connected together in the order of the sealing bottom plate 17, the lower thin metal plate 22, a contact point P between the lower thin metal plate 22 and the upper thin metal plate 23, the upper thin metal plate 23, the PTC element 21, the board support plate 18, the positive terminal connecting conductor pattern 29 of the circuit board 10, the electronic circuit 11, the positive terminal conductor pattern 30 of the circuit board 10, and the positive terminal plate 16.

Figure 7A:
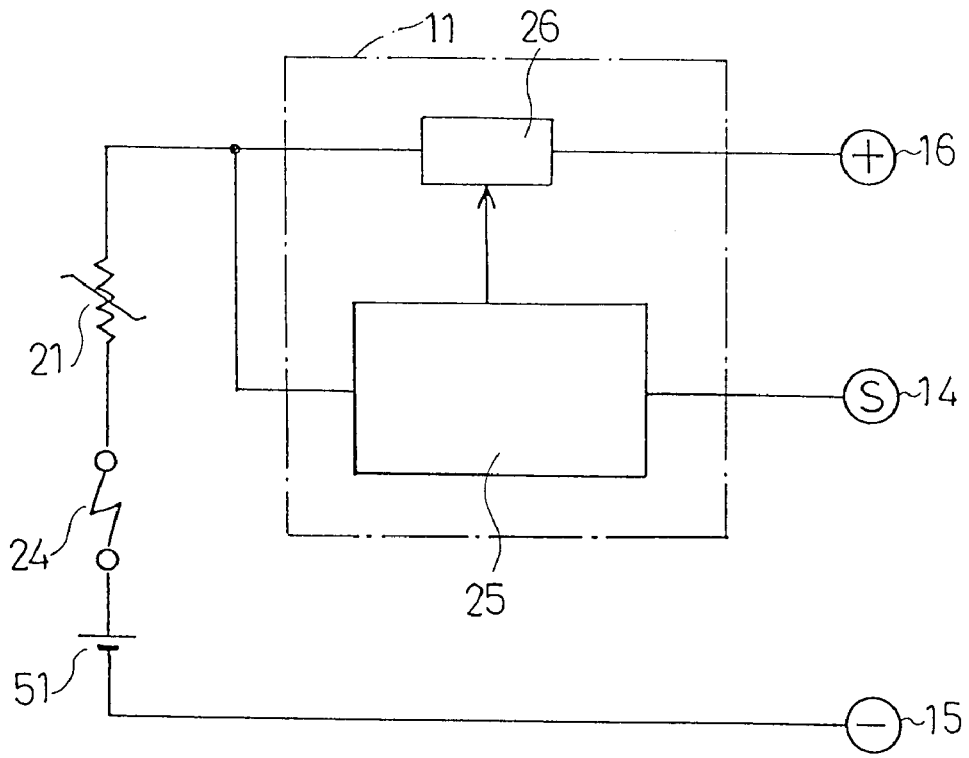
FIG. 7A is a schematic diagram of an electric circuit constituting the secondary battery according to the first embodiment.

FIG. 7A provides a schematic diagram for the conducting circuit of the secondary battery A described above. The negative terminal of the electricity generating elements 51 accommodated inside the battery case 15 is connected to the battery case 15, and this is made the negative terminal. The positive terminal of the electricity generating elements 51, on the other hand, is connected to the electronic circuit 11 through the current interruption means 24 made up of the lower thin metal plate 22 and the upper thin metal plate 23, and through the PTC element 21, and is connected to the positive terminal plate 16 through an FET 26 that is turned on and off by a battery protecting IC 25. The minus side of the power circuit of the electronic circuit 11 is connected to the S pole terminal plate 14. Thus the secondary battery A is given a three-terminal structure wherein the input/output terminals are the positive terminal plate 16 (+), the S pole terminal plate 14 (S), and the battery case 15 (−).

When the secondary battery A having this construction is installed in the equipment using the battery, and a shorting connection is made on the equipment side across the S pole terminal plate 14 and the negative terminal, i.e. the battery case 15, the power supply of the electronic circuit 11 is connected, and the secondary battery A can be used in a condition wherein it is protected from over-discharging, overcharging, and excessive discharge currents, etc., while, simultaneously, input and output are effected on the positive terminal side through the electronic circuit 11. Thus the electronic circuit 11 operates in a condition where the secondary battery A is installed in the equipment. When the secondary battery A is not in use, that is, in cases such as where it is not installed in equipment but stored for an extended time, the electronic circuit 11 does not consume power, and even if the electronic circuit 11 does consume a slight amount of power, self discharge loss caused by prolonged storage can be prevented.

Now, a battery cannot always be expected to be used in a normal manner, and hence must be constructed so that it can withstand equipment malfunctions or abnormal usage. With batteries of high energy density such as lithium ion secondary batteries, in particular, the ability to withstand abnormal conditions is critical. The battery protection device constructed inside the sealing member 8, as described in the foregoing, operates as follows in the face of abnormal conditions.

The lower thin metal plate 22 and upper thin metal plate 23 described in the foregoing, constituting the current interruption means 24, also function as a release valve for gas that is abnormally generated inside the battery. When the pressure inside the battery rises abnormally due to gas generated by the decomposition of electrolyte associated with abnormal use, the pressure inside the battery acts from the opening 17a formed in the sealing bottom plate 17 to the lower thin metal plate 22 and causes the lower thin metal plate 22 and the upper thin metal plate 23 to deform. In the center portion of the lower thin metal plate 22, the center portion of the upper thin metal plate 23 bulging out toward the interior of the battery is welded at a welding point P. Therefore, when the contact point P peels away due to that deformation, the conducting circuit is interrupted. The lower thin metal plate 22, formed as a flat surface, when deformation advances, ruptures from an easily ruptured place 22a formed as a C-shaped thin wall. When the lower thin metal plate 22 ruptures, the internal pressure reaches the upper thin metal plate 23, causes the bulged out part to reverse, and, with further increase in pressure, rupture occurs from an easily ruptured place 23a similarly formed as a C-shaped thin wall in the upper thin metal plate 23. When the lower thin metal plate 22 and the upper thin metal plate 23 rupture, there is no longer anything to act as a shield between the interior of the battery and the sealing member 8, wherefore the gas is discharged to the outside from the exhaust holes 18a formed in the board support plate 18. The exhaust holes 18a are provided in the side surface of the battery, so that the direction is perpendicular to the direction of blowout exhaust from the battery interior. Therefore, danger of the battery popping out due to the force of gas exhaust is eliminated.

The PTC element 21 has the function of preventing battery damage in a case where a short occurs between the positive terminal and negative terminal of the secondary battery A, resulting in excessive current. Upon the flow of excessive current, its temperature rises and reaches a prescribed critical temperature, at which it effects sudden rise in the resistance value, thereby blocking the discharge of excessive current.

Moreover, the electronic circuit 11 that forms the protective circuit, in addition to its functions for detecting overcharging and over-discharging conditions and interrupting the positive terminal conducting circuit, can also be enhanced as desired with circuitry for functions to interrupt the positive terminal conducting circuit when excessive discharge current flows, or to detect battery temperature and interrupt the positive terminal conducting circuit when a prescribed temperature is exceeded, etc. Hence secondary batteries having high energy density, or having restrictions on battery charging conditions or temperature conditions, etc., can be effectively used.

Next, a secondary battery B according to a second embodiment of the present invention is described. Elements in common with the construction of the first embodiment described in the foregoing are indicated by the same reference numerals and not further described below.

Figure 6:
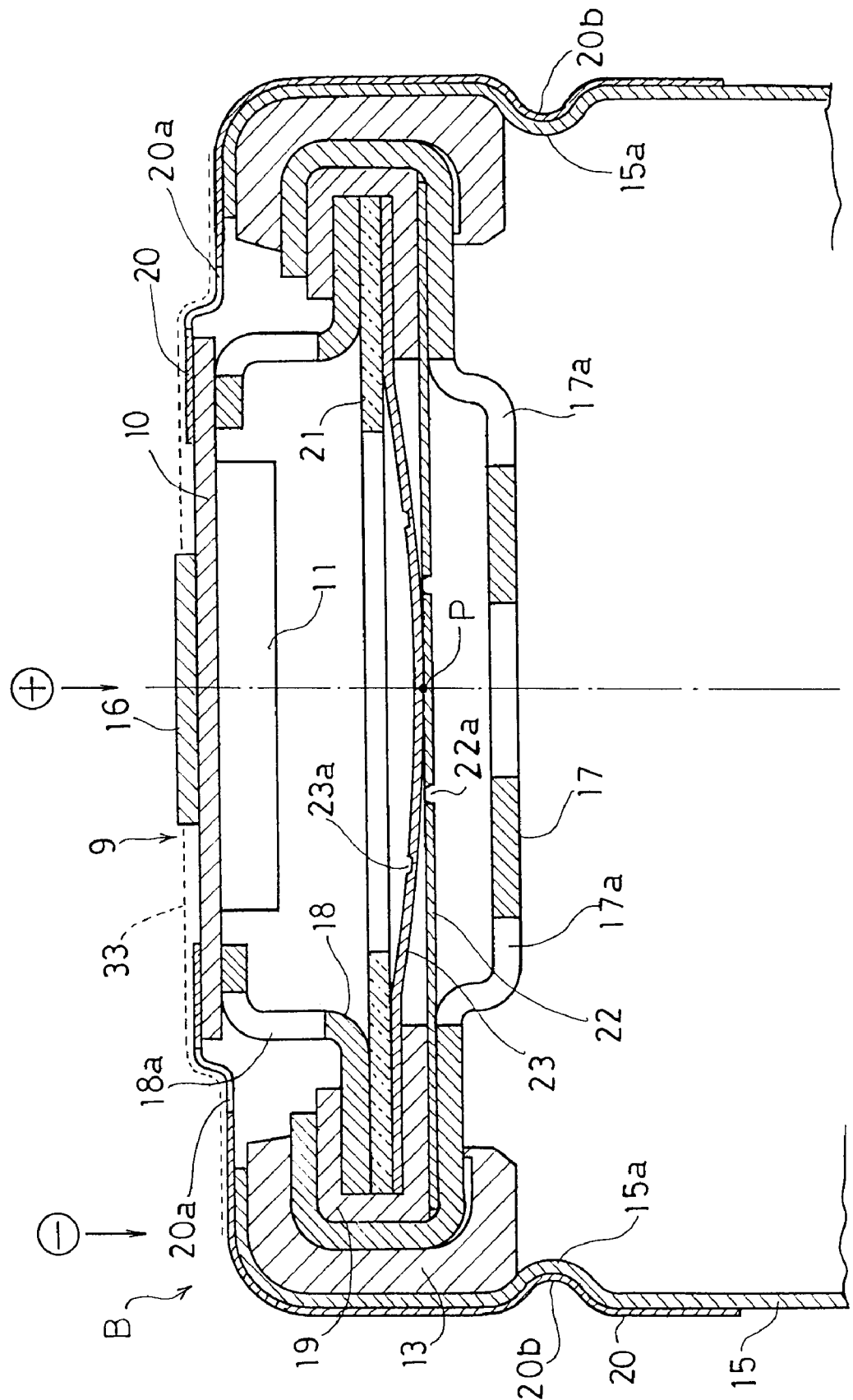
FIG. 6 is a cross-sectional view of a secondary battery according to a second embodiment.
Figure 7B:
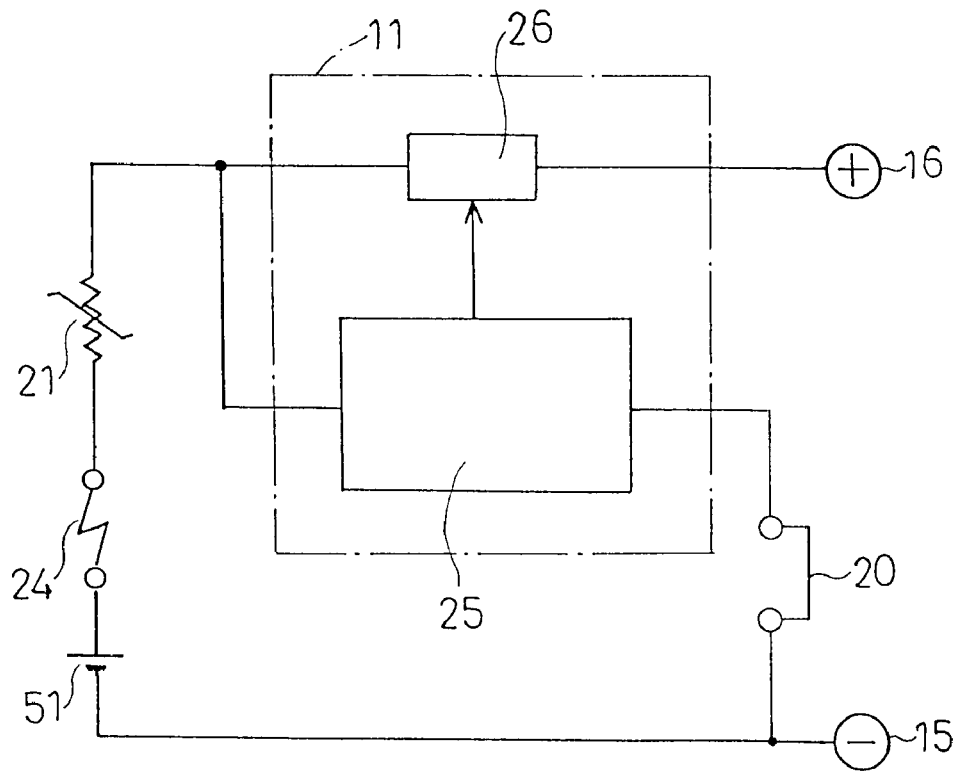
FIG. 7B is a schematic diagram of an electric circuit constituting the secondary battery according to the second embodiment.

In FIG. 6, the secondary battery B according to the second embodiment, while having the same fundamental construction as the secondary battery A according to the first embodiment, is constructed so that the S pole conductor pattern 31 formed in the circuit board 10 is electrically connected to the battery case 15 by a conducting cap (conducting member) 20. That is, the S pole terminal and the negative terminal are connected beforehand, so that the electronic circuit 11 is always in a conducting state. FIG. 7B represents a schematic diagram of such electronic circuit, wherein the S pole conductor pattern 31 is connected on the battery side of the battery case 15 that is the negative terminal by the conducting cap 20, wherefore the input/output of the secondary battery B takes on a two-terminal structure. With this construction, power will always be supplied to the electronic circuit 11 from the electricity generating elements 51, wherefore self discharge loss will occur when the battery is stored for an extended period without being installed in equipment. However, the connection construction for battery installation is simplified from the equipment side, wherefore the secondary battery B is suitable for the large volume of equipment that uses battery power and is sold with the secondary battery B installed.

Figure 8A:
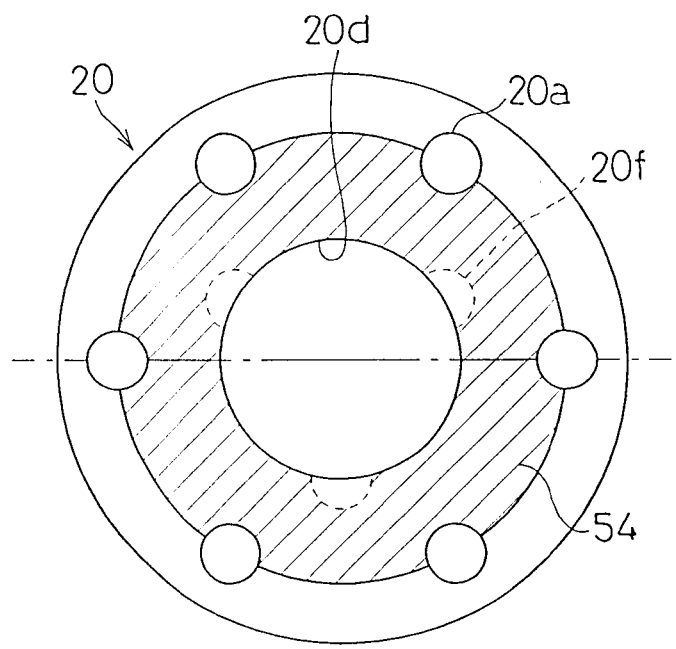
FIG. 8 represents the construction of a conducting cap, with FIG. 8A being a plan view, FIG. 8B being a side elevation view, and FIG. 8C being a side elevation view of an example modification.

The conducting cap 20 noted above, as diagrammed in FIG. 8, is formed in a cylindrical shape having a bottom of an inner diameter that fits on the open end side of the battery case 15, having an open portion 20d formed in the center portion of the bottom surface for exposing the positive terminal plate 16 to the outside, and a plurality of exhaust holes 20*a* formed also for exhausting gas. After a sealing member 9 has been secured by a caulking process to the open end of the battery case 15, the conducting cap 20, as diagrammed in FIG. 6, is fit on top of the battery case 15 from the sealing member 9 side, secured in position when a fitting part 20*b* is fit into a circumferential groove 15*a* formed in the circumferential direction for securing the sealing member 9 to the battery case 15, and electrically connected to the battery case 15. Furthermore, at the places where the bottom surface of the conducting cap 20 makes contact with the S pole conductor pattern 31 on the circuit board 10, these are joined by soldering or an electrically conductive adhesive. In order to make it easy to heat the joining portions when performing such soldered junctions, it is helpful to form cutaway parts 20*f* at locations in the open portion 20*d*, as indicated by the broken lines in FIG. 8A.

Figure 8B:
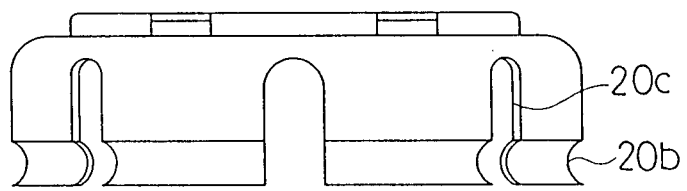
Figure 8C:
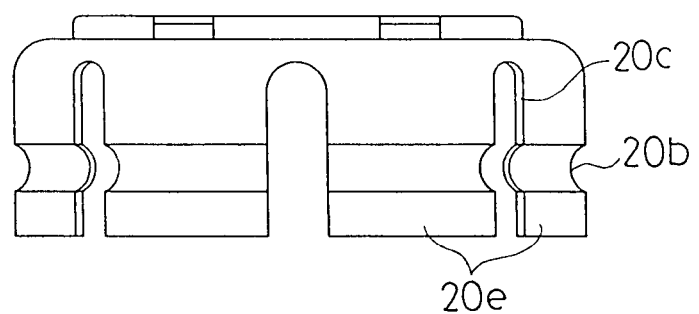

Moreover, in order to make the fitting and pressure contact with the battery case 15 sure, cut breaks 20*c* can be formed in the direction of the cylindrical axis in the conducting cap 20 as diagrammed in FIG. 8B and FIG. 8C. In order to effect definite electrical connection by such pressure contact, it is helpful to use a metal material having resiliency, such as phosphor bronze, for the material of the conducting cap 20. To make the electrical connection even more definite, moreover, the bottom of the fitting part 20*b* of the conducting cap 20 can be extended, and welding can be effected to the battery case 15 with that extended part 20*e*, as diagrammed in FIG. 8C. In order to make welding performance reliable, it is preferable that the material of the conducting cap 20 coincide with the material of the battery case 15. In lithium ion secondary batteries, nickel-plated steel plate is usually used, wherefore it will be desirable to form the conducting cap 20 also of nickel- plated steel plate.

Moreover, by arranging an insulating member 33 formed in a ring shape on the conducting cap 20, as indicated by the broken line in FIG. 6, the insulation between the positive and negative terminals is enhanced. Although not shown in the drawings, exhaust holes are formed in the insulating member 33, at the portions corresponding to the exhaust holes 20*a* formed in the conducting cap 20, so that the exhaust holes 20*a* are not blocked. Alternatively, an insulating coat 54 may be applied to the cross-hatched portion indicated in FIG. 8A, so that the bottom surface periphery of the conducting cap 20 functions as the minus input/output terminal of the secondary battery B. Thereby the secondary battery B will have a plus input/output terminal (positive terminal plate 16) and a minus input/output terminal arranged on the same surface, whereupon the battery connecting structure on the equipment side can be simplified. With conventional types of batteries there is a plus and a minus input/output terminal on each end of the battery. Therefore, given the input/output terminal structure described above, the difference with the secondary battery B of this construction is pronounced, eliminating compatibility with conventional batteries. Hence malfunctions resulting from mistakenly installing either the conventional battery or the secondary battery B of this construction can be prevented from occurring. A structure which eliminates compatibility with such conventional batteries becomes an important condition particularly in cases where the nominal battery voltage differs.

When the surface of the battery case 15 is covered with a heat-shrinking tube, surface of the conducting cap 20 is preponderantly covered, so that the securing of the conducting cap 20 to the battery case 15 is made more reliable.

Next, a secondary battery C according to a third embodiment of the present invention is described with reference to FIG. 9. Elements in common with the construction of the first and second embodiments described in the foregoing are indicated by the same reference numerals and not further described below.

Figure 9:
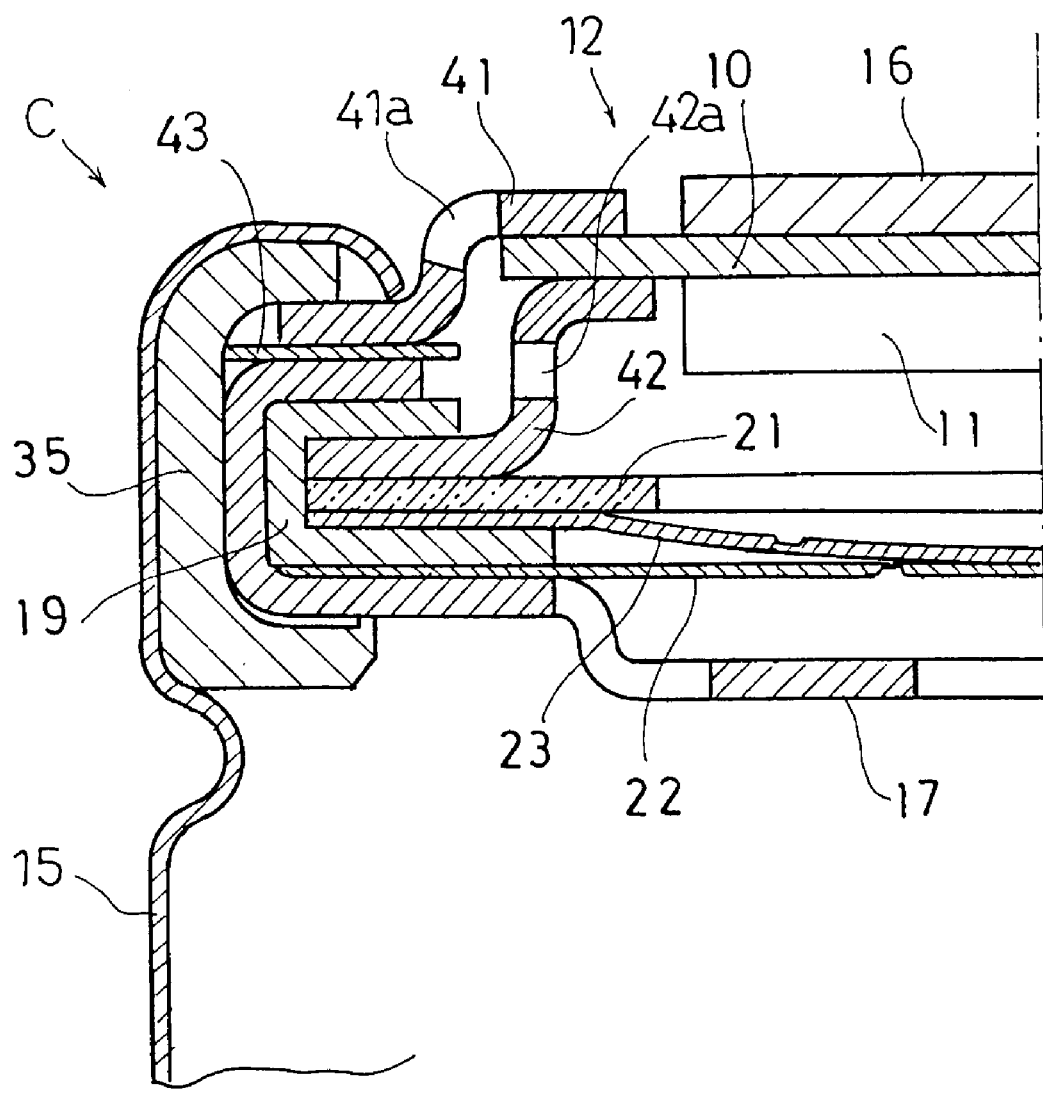
FIG. 9 is a half cross-sectional representation of the construction of a secondary battery according to a third embodiment.

As shown in FIG. 9, in the secondary battery C, instead of the structure of the secondary battery B according to the second embodiment wherein the conducting cap 20 is used and an electrical connection is effected between the S pole conductor pattern 31 and the battery case 15, an electrical connection is made between the S pole conductor pattern 31 and the battery case 15 by causing the battery case 15 to contact a connecting plate (connecting member) 41.

In the sealing member 12 used in the secondary battery C, the connecting plate 41 joined at the inner periphery to the S pole conductor pattern 31 of the circuit board 10 is stacked on the folded-back portion of the sealing bottom plate 17 with an intervening insulating plate 43 at the outer periphery thereof. When the sealing member 12 is secured by caulking to the battery case 15, it is sandwich-secured by the battery case 15 with an intervening outer gasket 35. When securing this sealing member 12, the open end side of the battery case 15 that is bent back toward the inside makes contact with the connecting plate 41, whereupon an electrical connection is effected to the battery case 15 through the connecting plate 41 of the S pole conductor pattern 31. In order to implement a surer electrical connection, a connection can be made between the battery case 15 and the connecting plate 41 using joining means such as laser welding or resistance welding.

Next, a fourth embodiment of the present invention is described with reference to FIG. 10 to 12. Elements in common with the construction of the first, second, and second embodiments described in the foregoing are indicated by the same reference numerals and not further described below. The drawings are half cross-sections of sealing members 44, 45, and 46, in the diameter dimension thereof, prior to attachment to the battery case 15. These sealing members 44, 45, and 46 according to the fourth embodiment have peculiar characteristics in the structure wherein they are attached to a circuit board 7.

Figure 10:
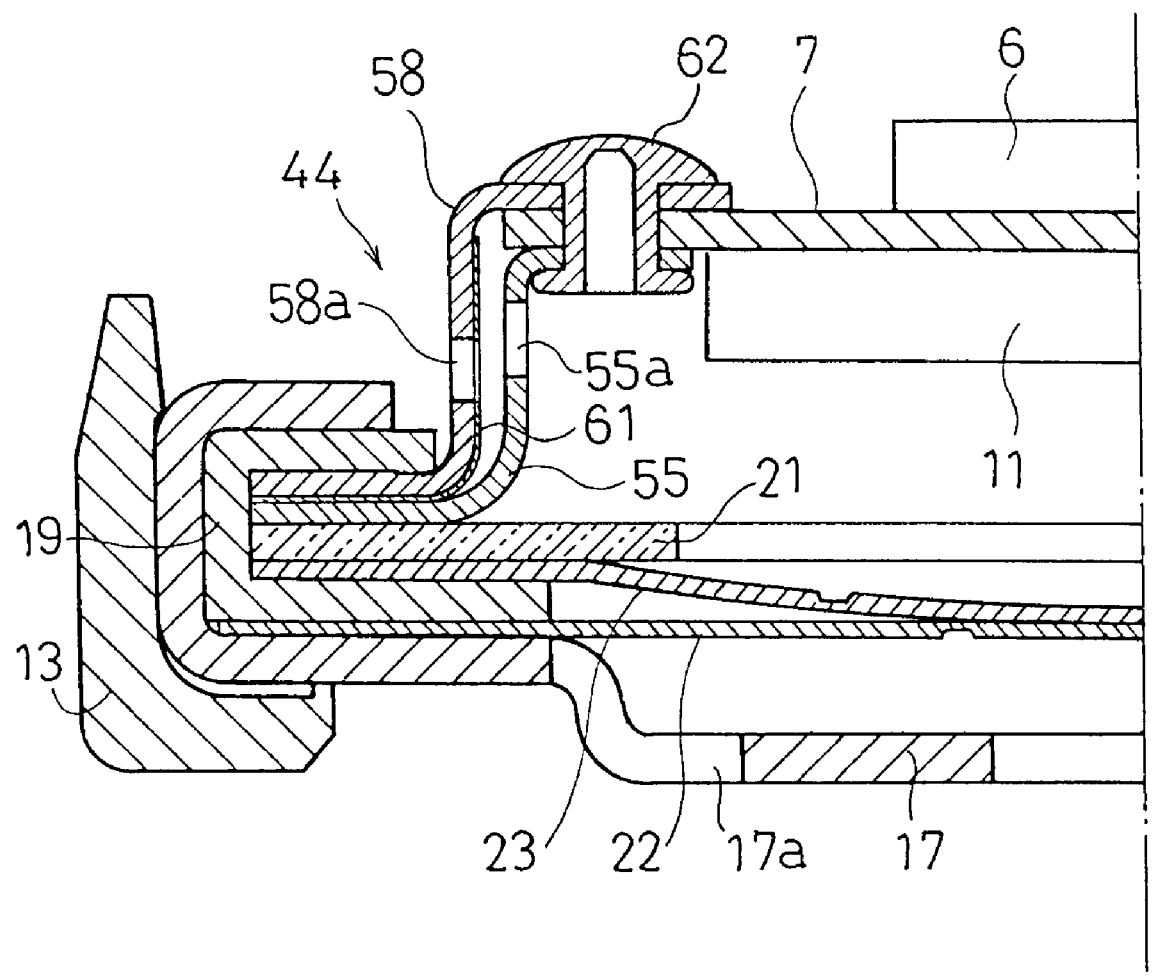
FIG. 10 is a half cross-sectional representation of the construction of a sealing plate for a secondary battery according to a fourth embodiment.

In FIG. 10, in the peripheral portion of the circuit board 7, the flat surfaces on the inner circumferential sides of an inner support plate (supporting member) 55 on the top surface side and an outer support plate (securing member) 58 on the bottom surface side, respectively, face each other. Resin rivets 62 are passed through opening holes formed in the inner support plate 55, the circuit board 7, and the outer support plate 58, respectively, from the inner support plate 55 side, the portions thereof projecting out on the outer support plate 58 side are melt-molded using an impulse welder, and these three members are fastened together as diagrammed. Such fastenings are made at places in the peripheral portion of the circuit board 7, whereupon the inner support plate 55 and the outer support plate 58 are secured to the circuit board 7. The surface of the outer support plate 58 facing the inner support plate 55 is coated with an insulating coating 61 exhibiting outstanding wear-resistant and insulating properties, as diagrammed, as in a reident process, thus maintaining electrical insulation with the inner support plate 55. The outer circumferential sides of these inner support plate 55 and outer support plate 58 are pressed together with the PTC element 21, the upper thin metal plate 23, and the lower thin metal plate 22 in a stack, with an intervening inner gasket 19, by the folded-back portion of the sealing bottom plate 17, as diagrammed. The sealing member 44 formed in this manner is secured by caulking to the open end of the battery case 15 with the intervening outer gasket 13.

In this construction, the conducting circuit on the positive terminal side from the positive terminal of the electricity generating elements are connected through the sealing bottom plate 17, lower thin metal plate 22, upper thin metal plate 23, PTC element 21, and inner support plate 55 to the positive terminal connecting conductor pattern 29 formed in the peripheral portion on the top surface side of the circuit board 7. The outer support plate 58 is insulated from the inner support plate 55, and is connected by the fastening structure described earlier to the S pole conductor pattern 31 formed in the peripheral portion on the bottom surface side of the circuit board 7. It is thus possible both to construct the battery as a three-terminal type with the outer support plate 58 being the S pole terminal, as in the first embodiment, and to construct the battery as a two-terminal type with the outer support plate 58 being connected to the battery case 15 that is the negative terminal of the battery, whereby the protective circuit is always kept energized.

Figure 11:
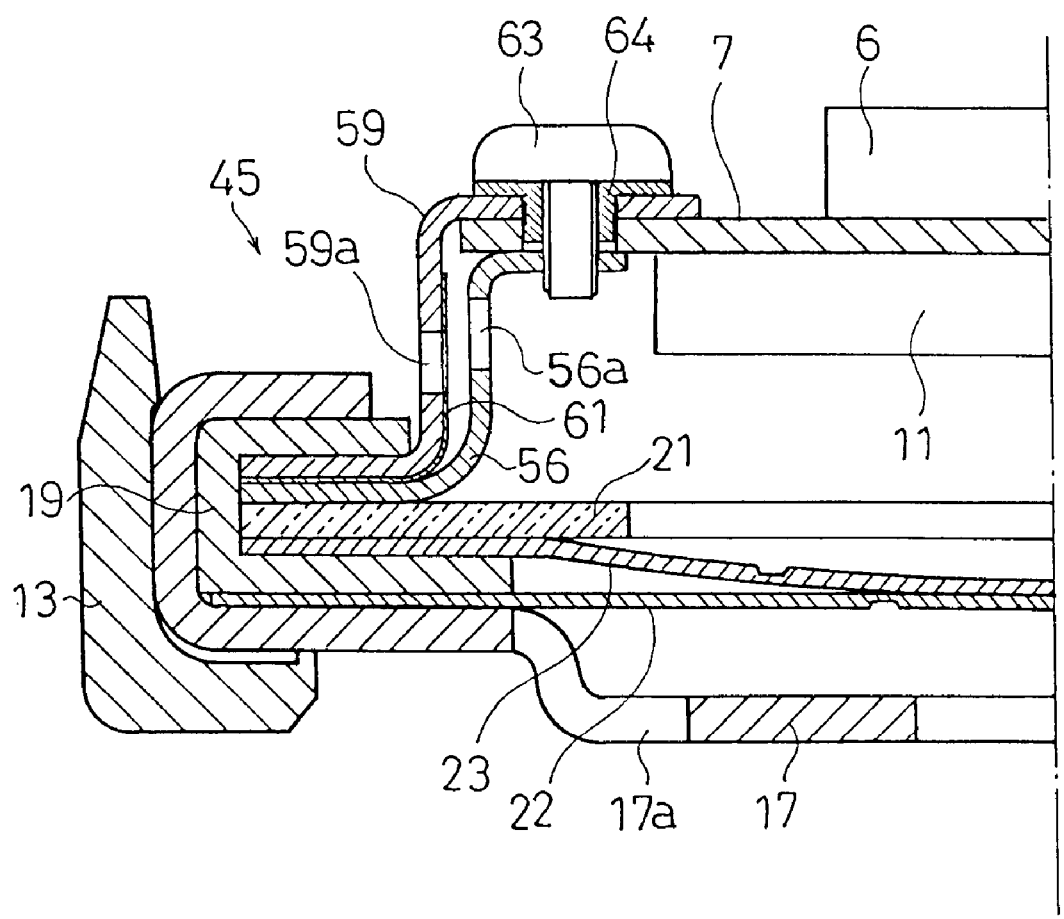
FIG. 11 is a half cross-sectional representation of a modified construction of the sealing plate for a secondary battery according to the fourth embodiment.

FIG. 11 shows a construction wherein the circuit board 7 is securely fastened by screwing. Metal screws (metal members) 63 are inserted from the outer support plate 59 in a condition wherein the outer support plate 59 and the circuit board 7 are electrically insulated by washers 64, and the peripheral portion of the circuit board 7 is securely fastened by the outer support plate 59 and the inner support plate 56 by screwing the metal screws 63 into the inner support plate 56. The construction otherwise of the sealing member 45 is the same as the fastening structure that uses resin rivets 62, described earlier. The heads of these metal screws 63 can be coated, as with a reident process, for example.

Figure 12:
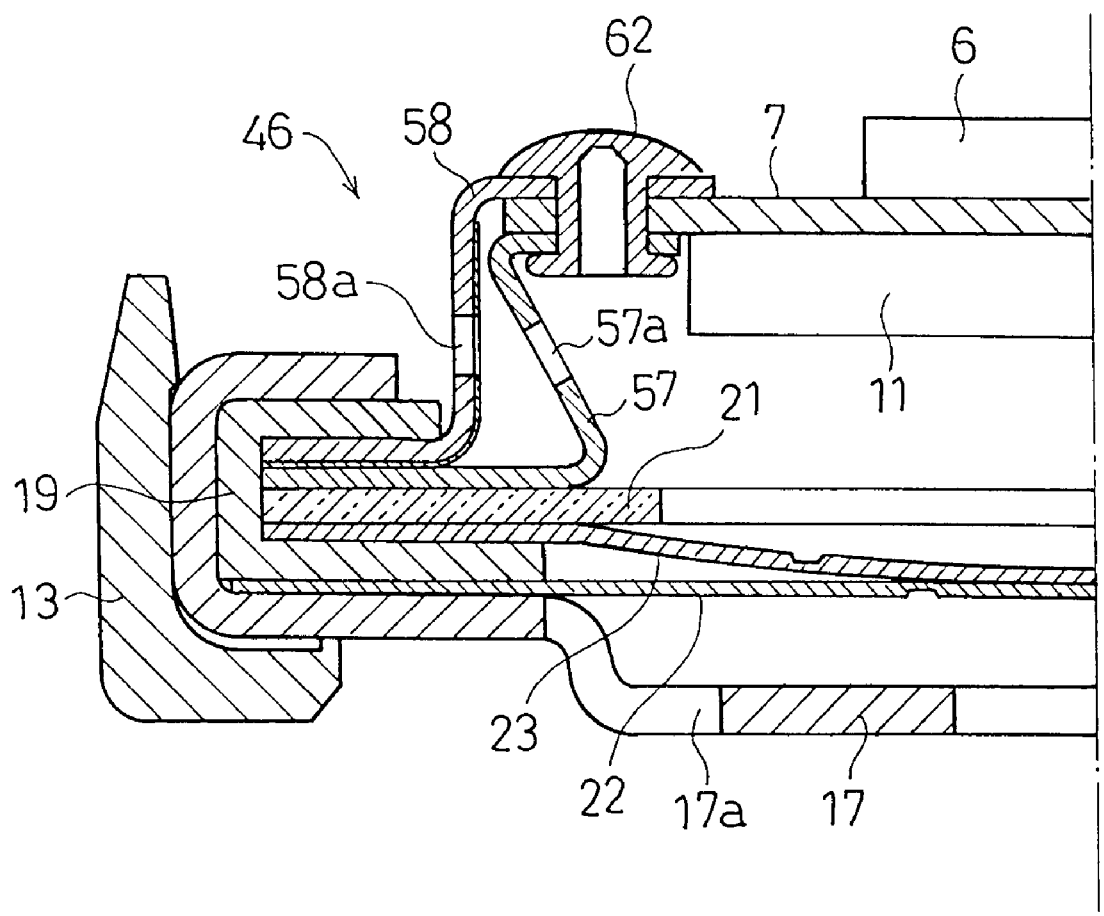
FIG. 12 is a half cross-sectional representation of a modified construction of the sealing plate for a secondary battery according to the fourth embodiment.

FIG. 12 represents an example modification of a fastening structure based on both the resin rivet 62-based fastening structure and the metal screw 63-based fastening structure described in the foregoing. As diagrammed, the cross-section of the inner support plate 57 is formed in an S shape. By constructing the inner support plate 57 in this manner, stress-induced deformation is prevented when securing by caulking the outer support plate 58 and inner support plate 57 by the sealing bottom plate 17, and less distortion is imposed on the circuit board 7.

In the constructions according to the fourth embodiment described in the foregoing, openings 55a, 56a, 57a, 58a, and 59a are formed in the inner support plates 55, 56, and 57, and outer support plates 58 and 59, respectively, in a direction perpendicular to the direction of the battery axis. These constitute exhaust holes for the release of gas when the internal pressure is abnormal. The positive terminal plate 6 joined to the positive terminal conductor pattern 30 formed in the center part on the top surface side of the circuit board 7, moreover, is formed to a material thickness that reaches higher than the height of the resin rivets 62 or metal screws 63.

When a protective circuit is provided inside the battery, as in the constructions of the embodiments described in the foregoing, it is possible to provide a function for blocking excessive current discharges by the construction of the electronic circuit 11. Therefore the provision of the PTC element 21 responsible for the function of blocking excessive current discharges caused by shorts and the like can be eliminated. That is, the functions of the electronic circuit 11 include a function for detecting excessive currents, and the conducting circuit is interrupted when such is detected, wherefore it is possible to do away with the PTC element 21. Furthermore, because the protective circuit is provided with a function for blocking overcharging, abnormal rises in the internal battery pressure induced by the decomposition of the electrolyte associated with overcharging can be prevented before they occur. Also, together with the PTC element, it is also possible to do away with the current interruption means that interrupt the conducting circuit when there is an abnormal rise in the internal battery pressure. A structure wherein the PTC element 21 is omitted, and a structure wherein the PTC element 21 and the current interruption means are omitted are described below.

Figure 13:
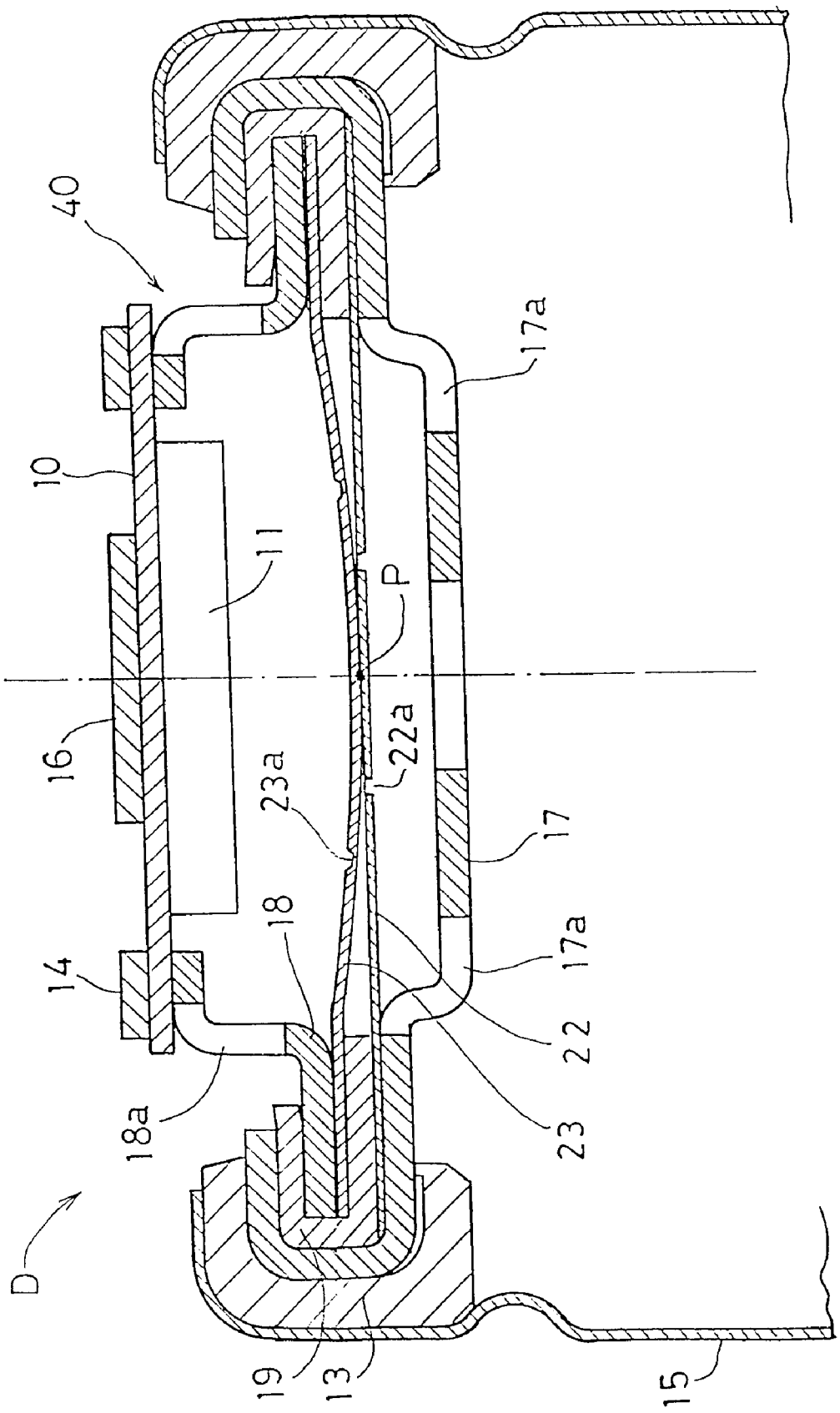
FIG. 13 is a cross-sectional representation of the construction of a secondary battery according to a fifth embodiment.

FIG. 13 represents the construction of a secondary battery D according to a fifth embodiment, constructed with the PTC element 21 eliminated from the construction of the first embodiment. By having the electronic circuit 11 take over the function of blocking excessive current discharges, the need to provide a PTC element is eliminated, and the construction becomes one having a sealing member 40 of a simple structure. In the sealing member 40, in order from the inner side of the battery, the sealing bottom plate 17, lower thin metal plate 22, upper thin metal plate 23, board support plate 18, and circuit board 10, are arranged one upon another. The lower thin metal plate 22, upper thin metal plate 23, and board support plate 18 are secured in the peripheral portions thereof with the sealing bottom plate 17 by caulking with the inner gasket 19 interposed therebetween. The sealing bottom plate 17 is connected by a lead to the positive terminal of the electricity generating elements (not shown), and a positive terminal conducting path is formed that communicates from the sealing bottom plate 17, the lower thin metal plate 22, the contact point P between the lower thin metal plate 22 and the upper thin metal plate 23, the upper thin metal plate 23, and the board support plate 18 to the positive terminal connecting conductor pattern 29 on the circuit board 10. The connections and operation in the circuit board 10 are the same as in the construction of the first embodiment described earlier, and so are not further described here. In this construction also, a conducting cap 20 can be provided and a two-terminal structure having no S pole terminal plate 14 constructed.

The PTC element 21 can also be done away with by arranging instead, in the same position, a metal ring of the same shape and dimensions.

Figure 14:
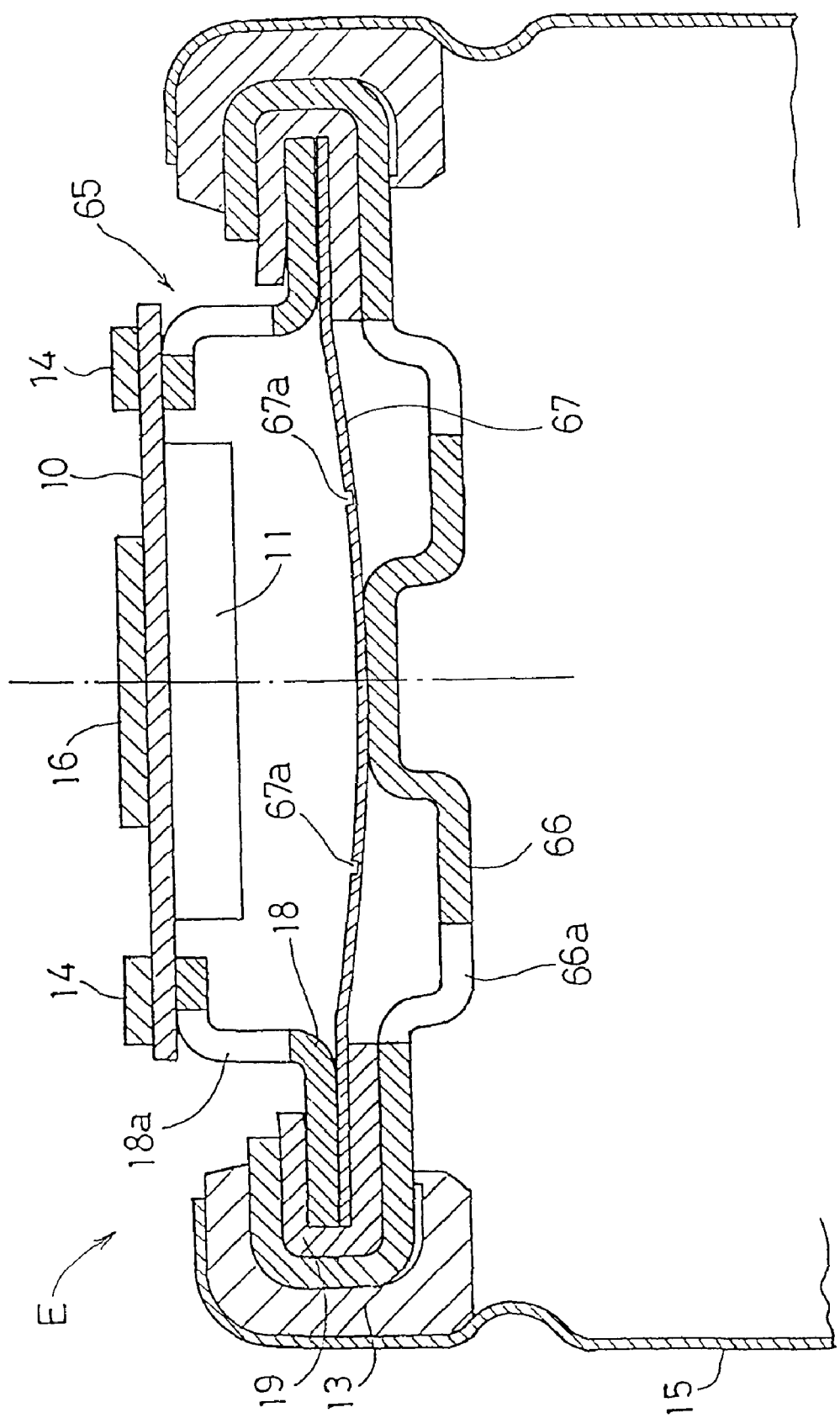
FIG. 14 is a cross-sectional representation of the construction of a secondary battery according to a sixth embodiment.

FIG. 14 represents the construction of a secondary battery E according to a sixth embodiment, with a sealing member 65 constructed which is provided only with a protective circuit as the battery protection device. The sealing member 65 comprises, in order from the inner side of the battery, a sealing bottom plate 66, shielding plate 67, board support plate 18, and circuit board 10. The peripheral portions of the shielding plate 67 and the board support plate 18 are secured, by caulking, by the sealing bottom plate 66 with the inner gasket 19 interposed therebetween. The shielding plate 67 effects a shield between the inside of the battery and the interior of the sealing member 65, and the air-tightness inside the battery is preserved by this shielding plate 67. The shielding plate 67 is welded to the projecting center portion of the sealing bottom plate 66 at the central position where the center part thereof bulges out toward the interior of the battery. A positive terminal conducting path is formed through the sealing bottom plate 66 that is connected by a lead to the positive terminal of the electricity generating elements (not shown), through the shielding plate 67, and through the board support plate 18, and a positive terminal circuit is constructed having the positive terminal plate 16 as the positive input/output terminal, from the board support plate 18 and through the positive terminal connecting conductor pattern 29 and electronic circuit 11 of the circuit board 10. Moreover, an easily ruptured part 67a is formed in a C shape formed as a thin wall in the shielding plate 67. Therefore, when the internal battery pressure rises abnormally due to abnormal use or the like, and a bulging part caused by abnormal internal pressure acting through the opening 66a formed in the sealing bottom plate 66 has pressure applied thereto in the reversing direction, rupturing occurs from the easily ruptured part 67a. The positive terminal conducting circuit is thereby interrupted, and, at the same time, the abnormal internal pressure is released to the outside from the exhaust holes 18a formed in the sides of the board support plate 18. The connections and operation in the circuit board 10 are the same as in the construction in the first embodiment, described earlier, so no further description thereof is given here. In this construction also, a structure can be constructed wherein a conducting cap 20 is provided and there is no S pole terminal plate 14.

Figure 15:
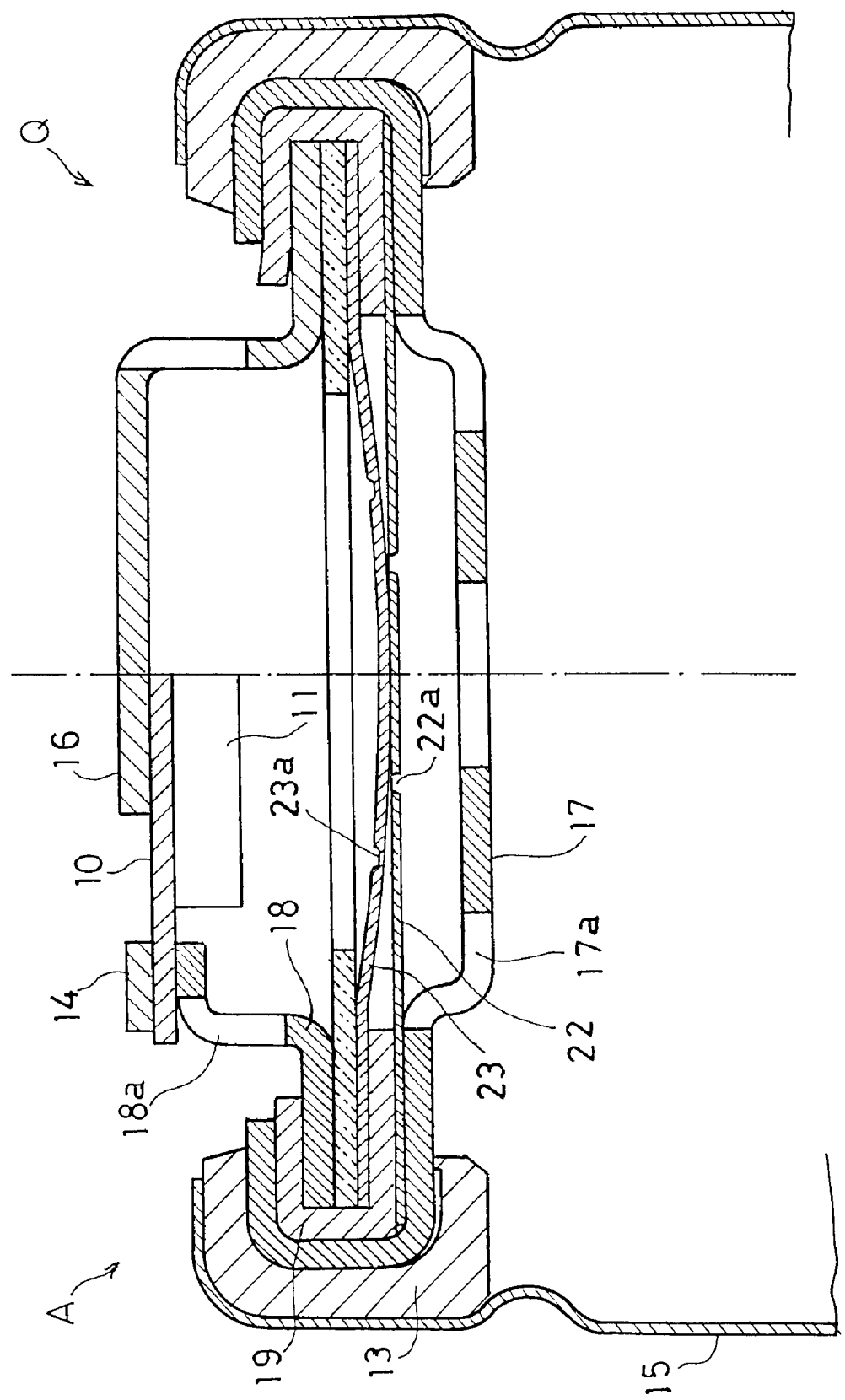
FIG. 15 is a cross-sectional diagram for comparing the construction of the present invention with a conventional construction.

The construction of the embodiments described in the foregoing is formed with roughly the same outer shape and dimensions as a conventional lithium ion secondary battery wherein no protective circuit is provided. FIG. 15 represents the secondary battery A indicated in the first embodiment and a conventional secondary battery Q having no built-in protective circuit, shown symmetrically about the centerline. If the battery capacity is rated the same, the diameter and vertical dimensions are roughly the same. Accordingly, even though the battery accommodating space in the equipment using a battery power supply is the same, there is no longer any need for a conventional scheme where a pack battery is formed in order to configure a protective circuit, and the space for accommodating the battery power supply can be reduced, all of which contribute to making the equipment smaller and lighter in weight. When used connected in series, moreover, each battery, with a protective circuit provided, can easily be charged using the charging function of the equipment.

Figure 16:
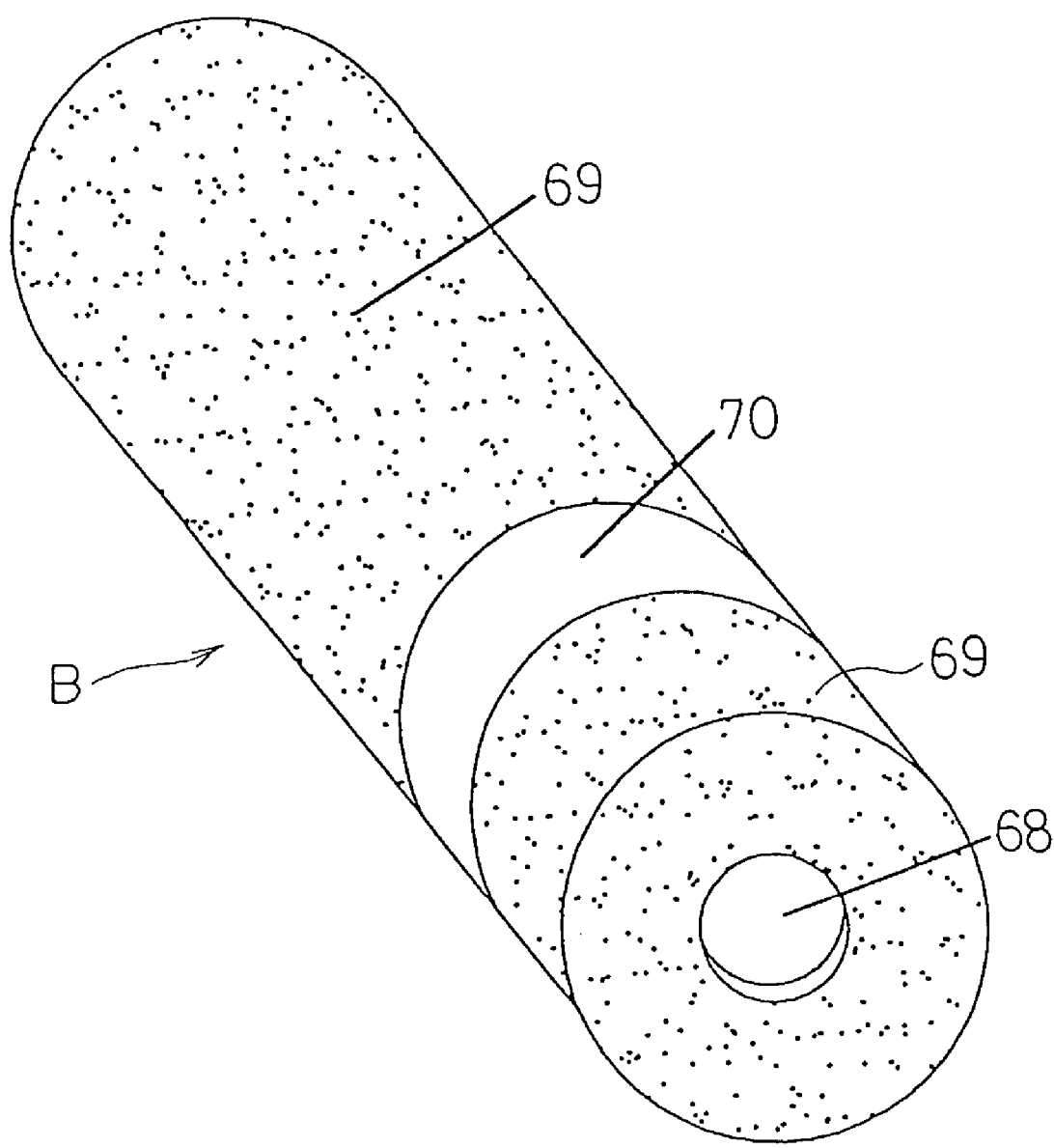
FIG. 16 is a perspective view of a battery case bottom surface structure and insulating coating structure.
Figure 17:
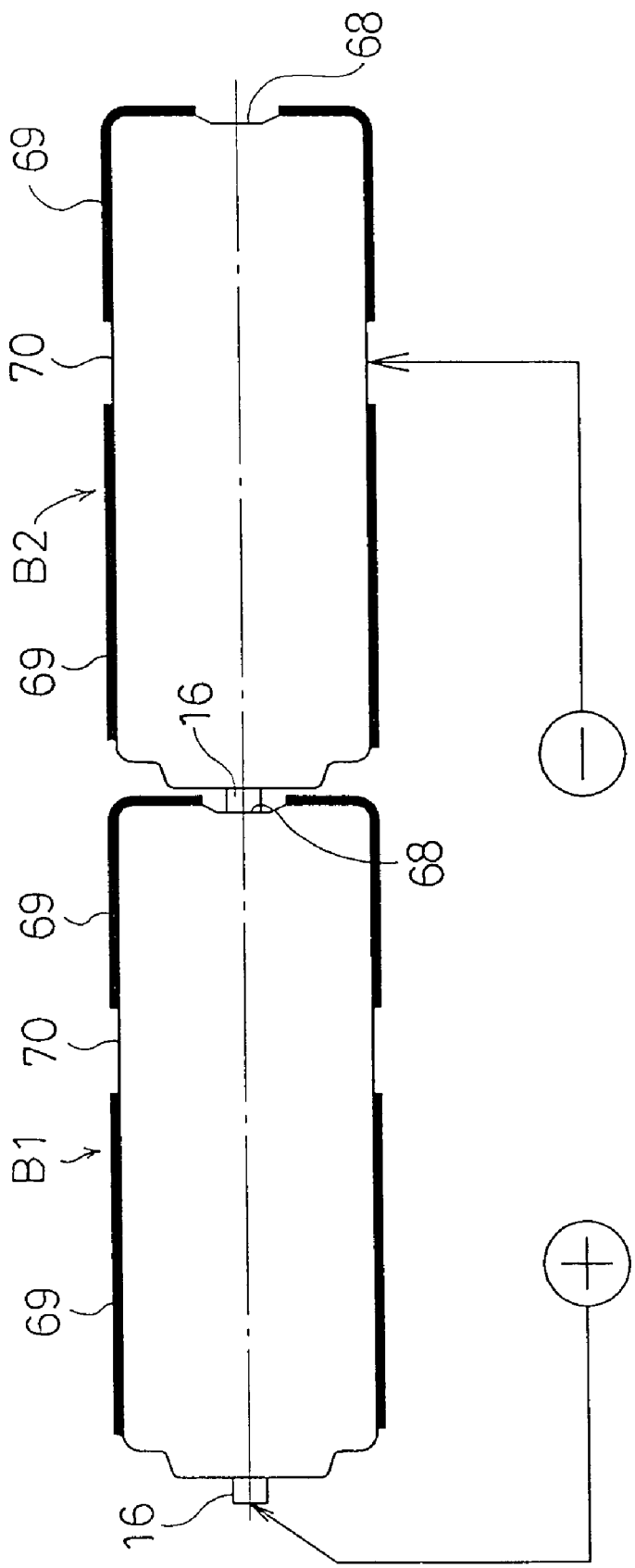
FIG. 17 is a model diagram of an example of series connection.

With cases where the batteries are used connected in series as shown in FIG. 16, a concave part 68 can be formed in the middle of the base surface of the battery case 15. An insulating coating 69 applied to the surface of the battery case 15, can be formed so that it leaves a portion of the side circumferential surface and the concave portion 68. The site where no coating is made on a portion of the side circumferential surface can be used as a minus terminal 70 for connecting the battery. This battery is represented as an example applied to the secondary battery B noted as the second embodiment, and can be used in series connections, as illustrated in FIG. 17. As shown in the drawing, a series connection is effected wherein the concave portion 68 in the first secondary battery B1 is contacted by the positive terminal plate 16 of the second secondary battery B2 that is connected in series therewith. The minus side of these series-connected batteries is lead out from the minus terminal 70 of the second secondary battery B2. FIG. 17 shows one example wherein two batteries are connected in series, but it will be the same in the case of more than two batteries connected in series.

Figure 18:
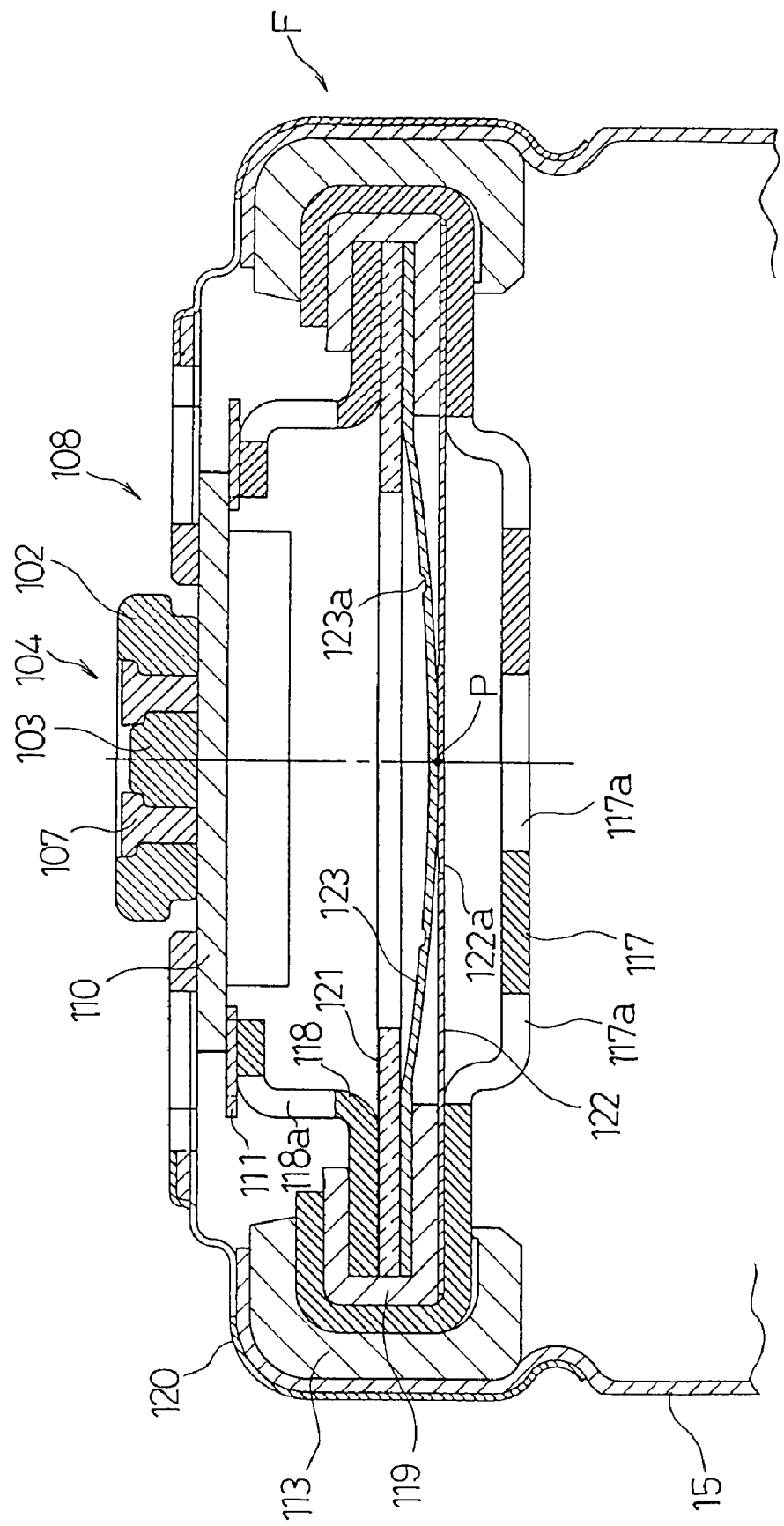
FIG. 18 is a cross-sectional representation of the construction of a secondary battery according to a seventh embodiment.

Next, the construction of a seventh embodiment is described. FIG. 18 represents a secondary battery F according to this embodiment as a cross-sectional diagram of the sealing portion. In this construction, electricity generating elements are accommodated inside a battery case 15 formed as a cylinder having a bottom, with the open end of the battery case 15 sealed by securing a sealing member 108 by caulking on the open end side of the battery case 15 with an intervening outer gasket 113.

The sealing member 108 comprises, in order from the inner side of the battery, a sealing bottom plate 117, a lower thin metal plate 122 and an upper thin metal plate 123 that constitutes current interruption means, a PTC element 121 constituting excessive current blocking means formed in a circular ring shape, an inner cap 118 that supports a circuit board 110, and the circuit board 110 which constitutes an electronic circuit forming a protective circuit, stacked upon one another. The sealing member 108 is formed in a disk shape for sealing the open end of the battery case 15 that is shaped as a cylinder having a bottom, and each constituent element is also formed in a circular shape. The lower thin metal plate 122, upper thin metal plate 123, PTC element 121, and inner cap 118 are stacked up at their peripheries, and secured by being pressed together by the peripheral portion of the sealing bottom plate 117, with an intervening inner gasket 119. The circuit board 110 is attached onto the inner cap 118 with an intervening spot ring 111. Thus a battery protection device is constructed inside the sealing member 108, comprising current interruption means, excessive current blocking means, and a protective circuit.

After sealing the open end of the battery case 15 by the sealing member 108 constructed as described above, by mounting an external cap 120 on the open end side of the battery case 15 so as to wrap around the peripheral portion of the circuit board 110 on the outer surface side, and joining this external cap 120 to the circuit board 110 and battery case 15, the secondary battery F provided with the battery protection device is completed.

In the construction described in the foregoing, the positive terminal plate of the positive and negative terminal plates accommodated inside the battery case 15 is connected by a lead to the sealing bottom plate 117, and a positive input/output circuit is formed through the sealing bottom plate 117, lower thin metal plate 122, contact point P between the lower thin metal plate 122 and upper thin metal plate 123, upper thin metal plate 123, PTC element 121, inner cap 118, spot ring 111, protective circuit formed on the circuit board 110, and positive input/output terminal 102 joined on the outer surface side of the circuit board 110. Also, the negative terminal plate of the positive and negative terminal plates is connected to the battery case 15. Therefore the battery case 15 becomes a negative input/output terminal, and the negative terminal of the secondary battery is connected to the circuit board 110 by the outer cap 120 joined to this battery case 15.

Since the interior of the sealing member 108 is shielded from the inside of the battery case 15 by the lower thin metal plate 122 and the upper thin metal plate 123, the circuit board 110 and other constituent elements are protected from the effects of insulation damage or corrosion, etc., resulting from the electrolyte or gas vaporized therefrom.

Next, the details of each constituent element are described. The construction of the current interruption means made up of the lower thin metal plate 122 and upper thin metal plate 123, and the construction of the excessive current restricting means constituted by the PTC element 121 are the same as in the construction of the embodiments described earlier and so are not further described here.

FIG. 19 represents conductor patterns formed on the inner surface 110a and outer surface 110b of the circuit board 110, both of which conductor patterns are connected at necessary places by through holes 140. As diagrammed in FIG. 19A, in the center portion of the inner surface 110a, a circuit pattern is formed for constituting the protective circuit by mounting IC components and other electronic components thereonto. A positive terminal connecting conductor pattern 129 is formed in the peripheral portion, to which a spot ring 111 is joined, for connecting to the positive terminal of the electricity generating elements through the sealing bottom plate 117, the lower thin metal plate 122, the upper thin metal plate 123, the PTC element 121, the inner cap 118, and the spot ring 111. As diagrammed in FIG. 19B, in the center portion of the outer surface 110b is formed a temperature detector terminal connecting conductor pattern 130 and, surrounding this, a positive input/output terminal connecting conductor pattern 131. On the outside thereof, moreover, are formed negative terminal connecting conductor patterns 132 and 132, opposed to each other in the diameter direction, and a test conductor pattern 133 for performing operational tests on the circuit board 110.

To the circuit board 110, as diagrammed in FIGS. 20A and 20B, is applied a solder resist 109 (indicated by crosshatching), in areas excluding the critical parts on both sides. This solder resist 109 is applied in general for such purposes as the prevention of solder bridges and other soldering flaws, the prevention of insulation deterioration between the conductor patterns, and the prevention of corrosion in the surface of the conductor patterns, but in the construction in this embodiment also takes on another function. That is, in the center of the inner surface 110a of the circuit board 110, a bare chip type of IC component 105 (cf. FIG. 21) is mounted, but, in this mounting position, due to the necessity of temperature detection (described later), an IC heat-radiating conductor pattern 134 is formed, connected through the through holes 140 to the negative terminal connecting conductor pattern 132, wherefore the IC component 105 must be mounted so that it is insulated therefrom. The solder resist 109 takes on the role of maintaining the insulation between that IC component 105 and the IC heat-radiating conductor pattern 134. However, because the thermal conductivity of the solder resist 109 is low, the heat-radiating ability of the IC component 105 will be impaired. Thereupon, as diagrammed in FIG. 20A, the solder resist 109 is applied to the mounting position of the IC component 105 so as to form a hexagon array resist 109a wherein hexagons are arrayed. When an adhesive is coated on this hexagon array solder resist 109a and the IC component 105 is mounted, the spaces between the arrayed hexagon array resist 109a are filled with the adhesive, and the heat from the IC component 105 is conveyed to the IC heat-radiating conductor pattern 134 by thermal conductivity through the adhesive. The insulation of the IC component 105 is thus secured by the hexagon array resist 109a, and, simultaneously, heat-radiation properties are obtained through the adhesive. The hexagon array resist 109a may be made in an array of different shapes, but it is easy to effect a uniform array with an array of hexagons, and it is thereby possible to secure portions of the space at the position where the IC component 105 is mounted wherein there is no hexagon array resist 109a, that is, to insure that the area occupied by the adhesive is adequate.

In the circuit board 110 to which the solder resist 109 has been applied, as diagrammed in FIG. 21, on the inner surface 110a thereof, the IC component 105 and other electronic components 114 are mounted, and on the outer surface 110b thereof, a thermistor (temperature detection element) 112 is mounted to form a connection between the temperature detector connecting conductor pattern 130 and the negative terminal connecting conductor pattern 132. The IC component 105 mounted on the hexagon array resist 109a, as diagrammed, is interconnected by wire bonding, while the electronic component 114 and the thermistor 112 are connected by soldering. The spot ring 111 is joined by soldering to the top of the positive terminal connecting conductor pattern 129 on the inner surface 110a. This soldering is done so that the spot ring 111 is soldered to portions where no solder resist 109 has been applied to the positive terminal connecting conductor pattern 129 exposed below the openings 111b and 111b formed in the spot ring 111. It is preferable that the spot ring 111 be formed of a copper-nickel alloy (Cu 55%, Ni 45%) or a clad metal containing a copper-nickel alloy, which will exhibit outstanding weldability and electrical conductivity. As diagrammed in FIG. 25, a complex terminal 104 wherein the positive input/output terminal 102 and temperature detector terminal 103 have been integrated is joined above the positive input/output terminal connecting conductor pattern 131 and the temperature detector terminal connecting conductor pattern 130 on the outer surface 110b.

Figure 22:
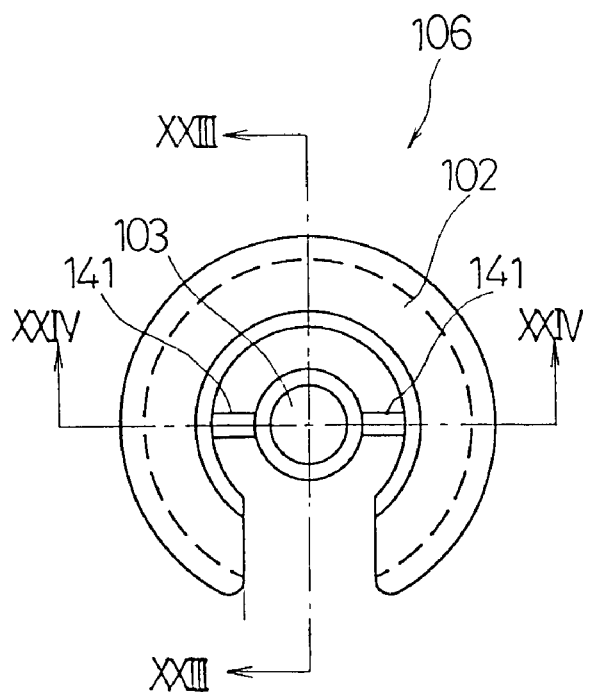
FIG. 22 is a plan view representing a construction of a metal part for forming a complex terminal.
Figure 23:
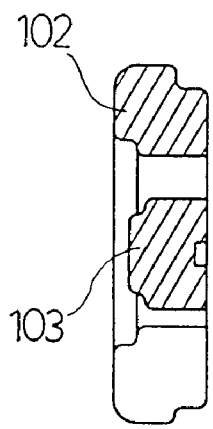
FIG. 23 is a cross-sectional view as seen from the XXIII—XXIII line in FIG. 22.
Figure 24:
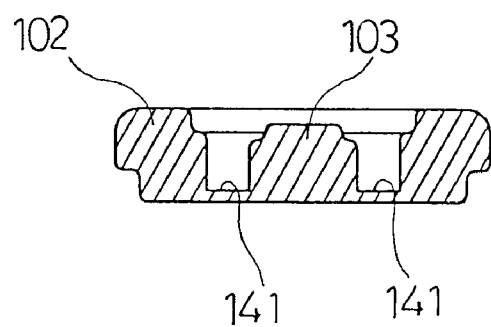
FIG. 24 is a cross-sectional view as seen from the XXIV—XXIV line in FIG. 22.

The complex terminal 104 is formed so as to integrate the temperature detector terminal 103 and the positive input/output terminal 102, by metal molding and resin molding. As diagrammed in FIG. 22 to 24, a metal part 106 is formed by metal molding wherein the integrated center temperature detector terminal 103 and the outer positive input/output terminal 102 are connected by bridges 141 and 141 formed as thin walls therebetween. The space between the temperature detector terminal 103 and the positive input/output terminal 102 in this metal part 106 is filled with an insulating resin 107 by resin molding, as diagrammed in FIG. 25 to 27, and the bridges 141 and 141 are separated therefrom. Thus, while the positive input/output terminal 102 and the temperature detector terminal 103 are electrically insulated by the insulating resin 107, both are connected by the insulating resin 107 and form an integrated complex terminal 104.

Figure 25:
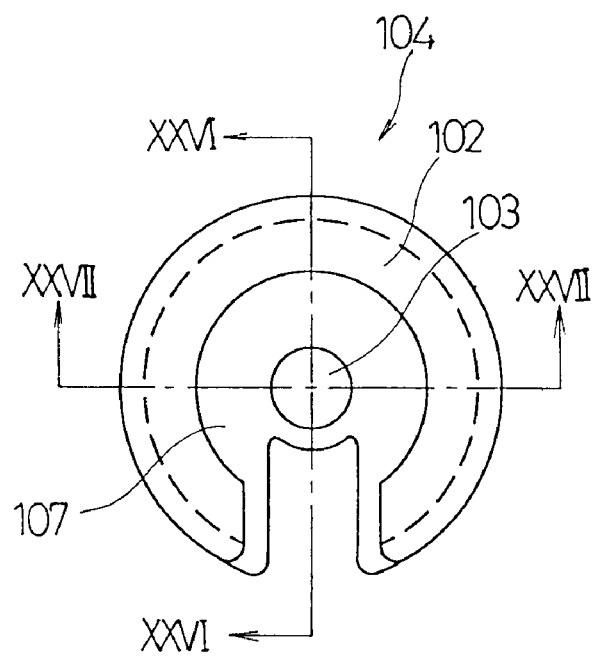
FIG. 25 is a plan view representing a construction of a complex terminal.
Figure 26:
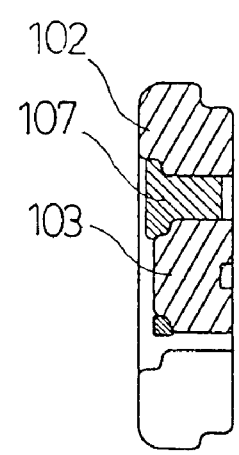
FIG. 26 is a cross-sectional view as seen from the XXVI—XXVI line in FIG. 25.
Figure 27:
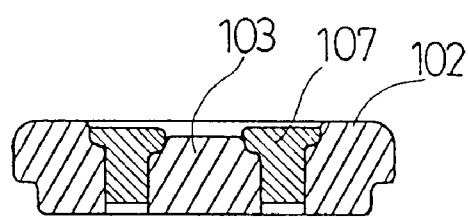
FIG. 27 is a cross-sectional view as seen from the XXVII—XXVII line in FIG. 25.

If the temperature detector terminal 103 constituting this complex terminal 104, as diagrammed in FIG. 25 to 27, is constructed so that the apex thereof is positioned lower than the apex of the positive input/output terminal 102, then the complex terminal 104 can be used while disabling temperature detection if so desired. That is, in cases such as where the secondary battery F is connected in series to configure a battery pack, the temperature detection function can be provided in the battery pack. Therefore, when the positive input/output terminal 102 is brought up against the bottom of the battery case 15 of another secondary battery F, the temperature detector terminal 103 positioned lower than the positive input/output terminal 102 will be in a non-contacting condition, whereupon that temperature detection function can be disabled. Even when used singly, moreover, by contacting the positive input/output terminal 102 with a flat-plate contact element, the use of the temperature detector terminal 103 can be disabled.

Conversely, when a complex connector having a coaxial structure wherein the contact element to the temperature detector terminal 103 is formed in the center position, and the contact element to the positive input/output terminal 102 is formed at the periphery thereof is constructed on the equipment side, simultaneous connection to both the positive input/output terminal 102 and the temperature detector terminal 103 can be effected. Moreover, a negative terminal connecting part is formed on the outer cap 120 (described later), on the same surface side as the positive input/output terminal 102 and the temperature detector terminal 103. Therefore, connections to the positive terminal, negative terminal, and temperature detection terminal of the secondary battery F can respectively be effected from one direction, and the equipment battery connection structure can be constructed simply.

Figure 28A:
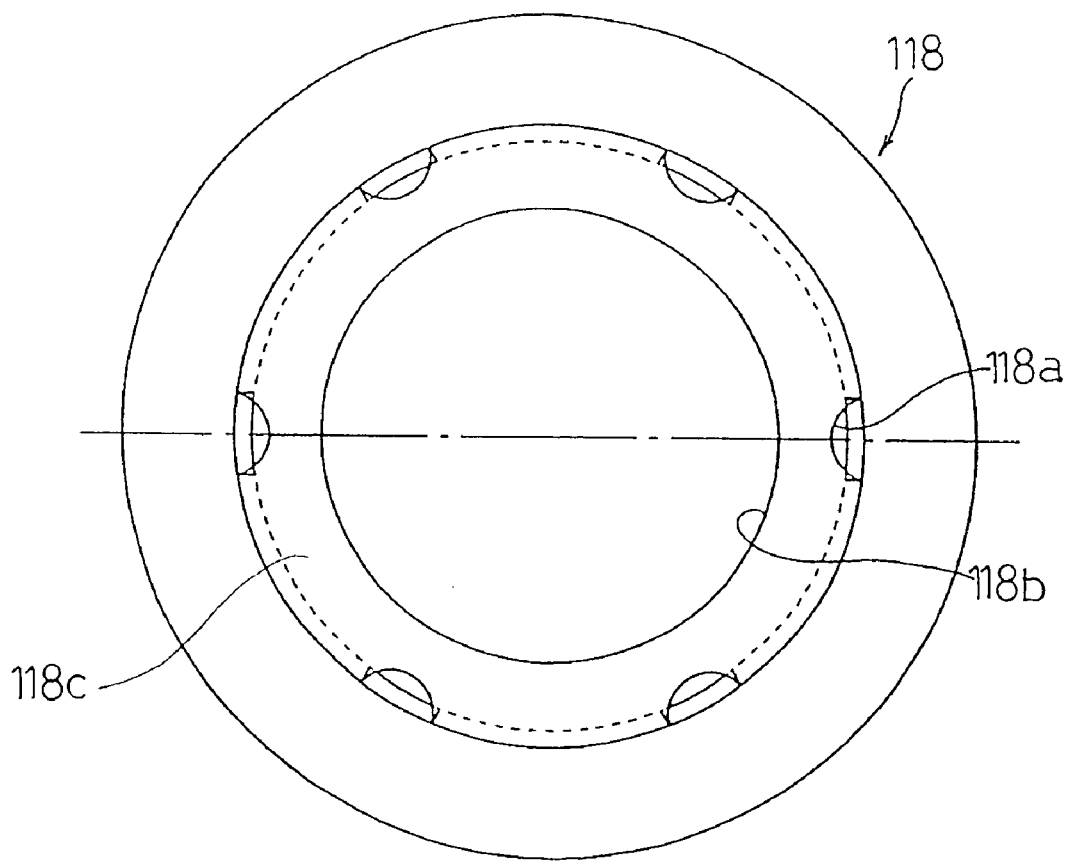
FIG. 28 represents the construction of an inner cap, with FIG. 28A being a plan view and FIG. 28B being a side elevation view.
Figure 28B:
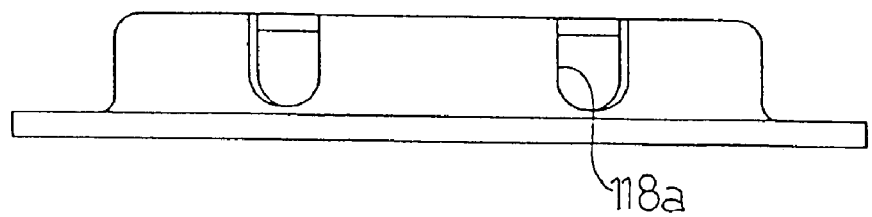

The circuit board 110 formed as described in the foregoing is secured to the outermost portion of the sealing member 108 by joining projections 111a and 111a at both ends of the attached spot ring 111 to the inner cap 118 by spot welding, as diagrammed in FIG. 18. The inner cap 118, as diagrammed in FIG. 28, has an opening 118b formed in an apex portion formed in a cap shape for allowing passage of the circuit constituting components mounted on the circuit board 110. The spot ring 111 is spot welded to a flat portion 118c formed about the periphery of this opening 118b. A plurality of exhaust holes 118a are also formed about the periphery of the inner cap 118.

Figure 31A:
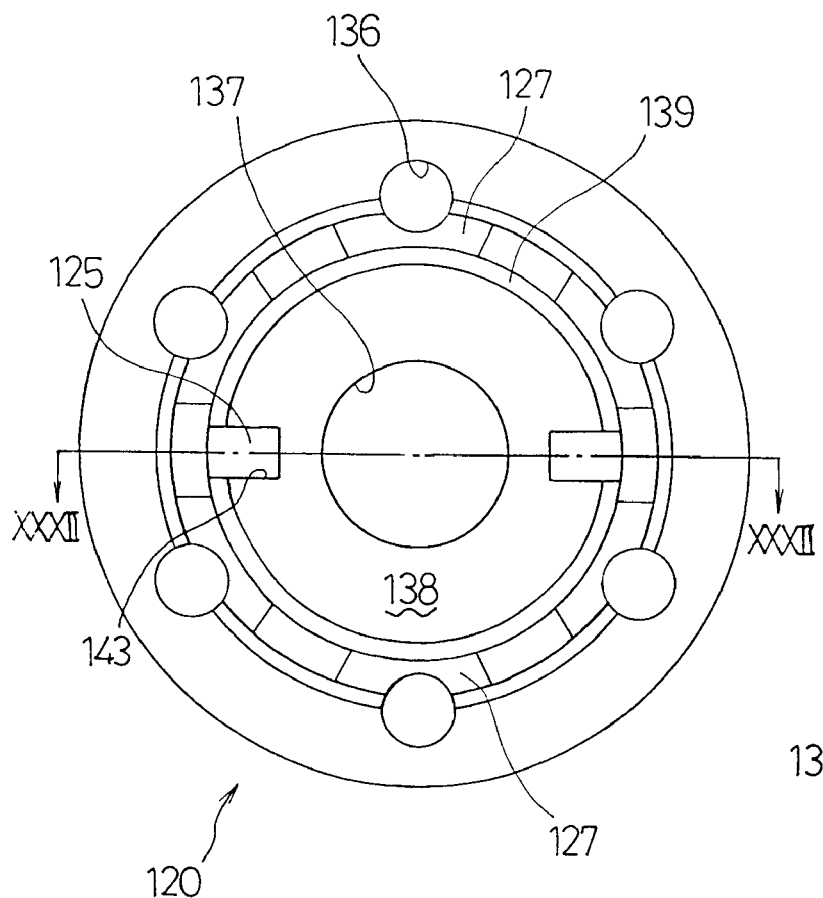
FIG. 31 represents the construction of an outer cap, with FIG. 31A being a plan view and FIG. 31B being a side elevation view.
Figure 31B:
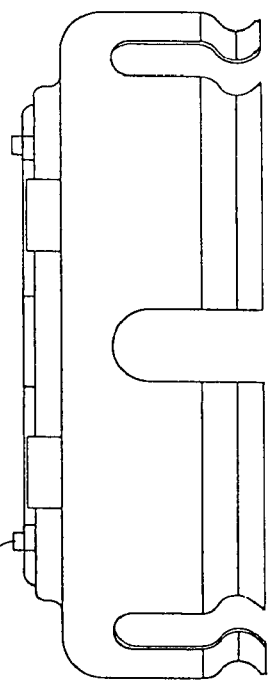

The sealing member 108 having the construction described in the foregoing seals the open end of the battery case 15 by being secured by caulking to the open end of the battery case 15 with an intervening outer gasket 113. The open end of the battery case 15 sealed by the sealing member 108 has an outer cap 120 mounted thereon as diagrammed in FIG. 18. The outer cap 120 is constructed, as diagrammed in FIG. 31, such that a tubular part formed as a cylinder having a bottom fits onto the battery case 15, the bottom contacts the circuit board 110 at a metal portion thereof, and, together therewith, the outer surface side of the battery is covered with the resin portion of the outer cap 120, excluding the terminal portion(s) of the circuit board 110.

Figure 29A:
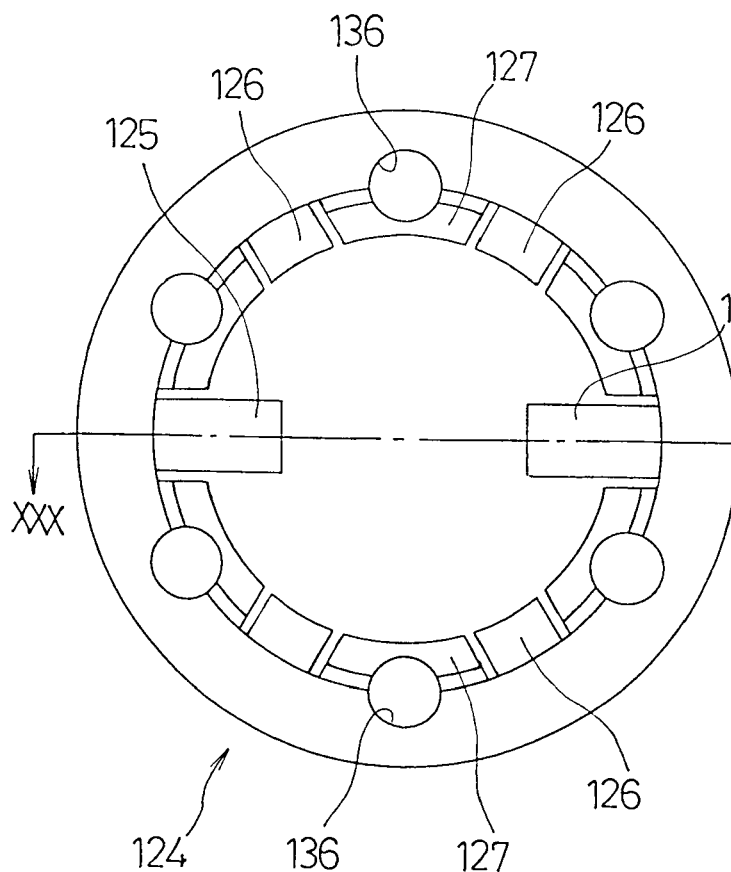
FIG. 29 represents the construction of a metal member that forms an outer cap, with FIG. 29A being a plan view and FIG. 29B being a side elevation view.
Figure 29B:
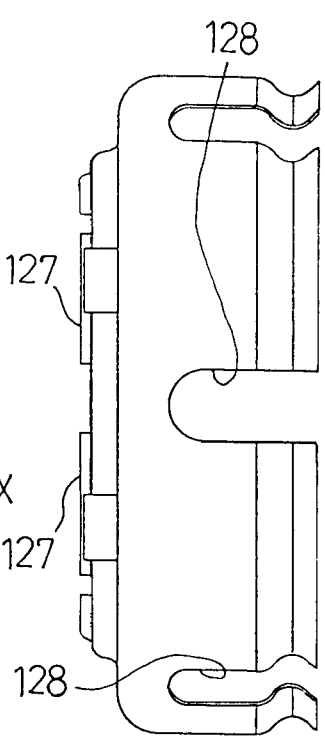
Figure 30:
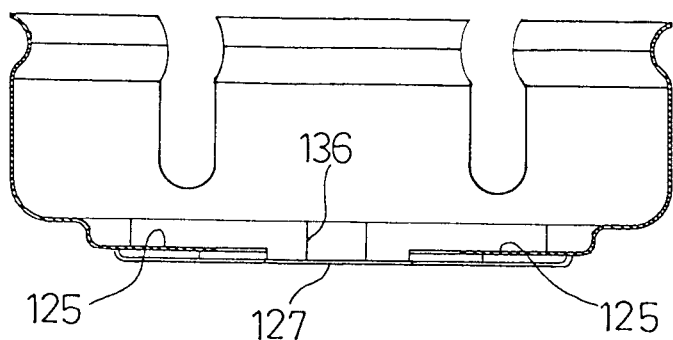
FIG. 30 is a cross-sectional view as seen from the XXX—XXX line in FIG. 29A.

FIG. 29 and 30 diagram the construction of a metal member 124 that constitutes the outer cap 120 noted above. Plate material that is a copper-nickel alloy (Cu 55%, Ni 45%) or clad metal containing a copper-nickel alloy is press-processed and thereby the bottom of the bottomed cylinder is formed in a three-stage structure. Negative terminal connection pieces 125 and 125 are formed facing each other in the diameter dimension at an intermediate height. A plurality of board clamping pieces 126 are formed at the same molding height as the negative terminal connection pieces, and a plurality of upper surface pieces 127 are formed at positions higher than the board clamping pieces 126. Exhaust holes 136 are also formed at the positions of the upper surface pieces 127. Cut-outs 128 are formed at a plurality of positions in the cylindrical part, so that the outer cap 120 can readily fit onto the battery case 15.

Figure 32:
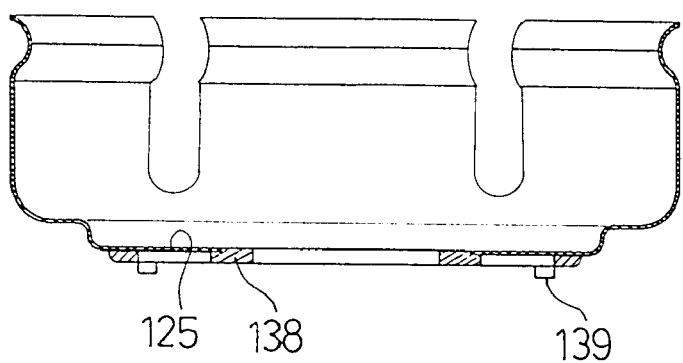
FIG. 32 is a cross-sectional view as seen from the XXXII—XXXII line in FIG. 31A.

A resin molded part 138 is formed by resin molding at the bottom, in the metal member 124 constructed as described above, as diagrammed in FIG. 31 and 32, whereby a bottom surface is formed provided with a terminal accepting hole 137 in the center. This resin molded part 138 has, in addition to the terminal accepting hole 137, negative terminal openings 143 formed in the tops of the negative terminal connecting pieces 125, so that the complex terminal 104 is passed through the terminal accepting hole 137, and the negative terminal connecting pieces 125 can be joined from the negative terminal openings 143 to the negative terminal connecting conductor pattern 132 on the circuit board 110. A rib 139 is formed in a ring shape at a site excluding the negative terminal opening 143 portions, and shorts across the positive terminal and negative terminal are prevented.

Junctions are made by ultrasonic welding means or the like between the negative terminal connecting conductor pattern 132 on the circuit board 110 and the negative terminal connecting pieces 125 which can be seen from the negative terminal openings 143. The negative terminal connecting pieces 125 as seen from the negative terminal openings 143 can be used as secondary battery F negative input/output terminals from the equipment side. Therefore, a negative terminal contact part can be constructed in the same plane as the positive input/output terminal 102 and temperature detector terminal 103, and the equipment side structure for connecting to the secondary battery F can be simply constructed. The negative terminal connection of the secondary battery F, furthermore, can be made with the bottom of the battery case 15 and not only with these negative terminal connecting pieces 125.

Figure 33:
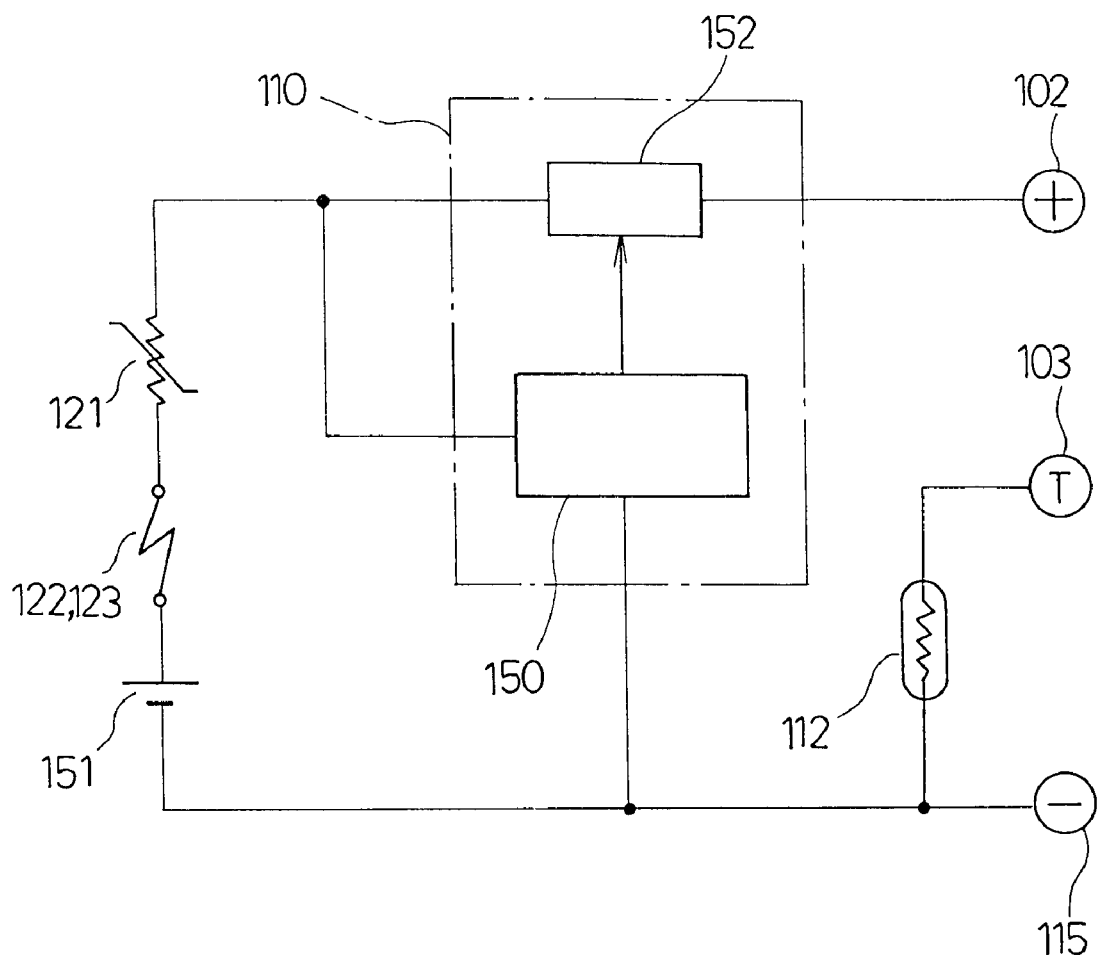
FIG. 33 is an electrical schematic diagram for a secondary battery according to the seventh embodiment.

When the construction of the secondary battery F described in the foregoing is represented as a schematic diagram, the result is as given in FIG. 33. The negative terminal plate of the electricity generating elements 151 accommodated inside the battery case 15 is connected to the battery case 15, and this is made the negative input/output terminal. The positive terminal plate of the electricity generating elements 151, on the other hand, is connected to the protective circuit on the circuit board 110 through the current interruption means constructed by the lower thin metal plate 122 and the upper thin metal plate 123 and through the PTC element 121, and connected to the positive input/output terminal 102 through an FET 152 that is turned on and off by a control circuit 150. A thermistor 112 mounted on the outer surface of the circuit board 110, moreover, is connected to a temperature detector terminal T.

The current interruption means in the construction described in the foregoing effect a shield between the interior of the battery and the interior of the sealing member 108, prevent the circuit board 110 and other constituent elements inside the sealing member 108 from coming into contact with the electrolyte, and prevent the battery interior from communicating with the outside air. When, however, the internal battery pressure has risen abnormally due to gas generated by the decomposition of electrolyte associated with abnormal usage, it is deformed by the abnormal internal pressure and, when the contact point P between the lower thin metal plate 122 and upper thin metal plate 123 peels away, the current conduction is interrupted. With the advance of that deformation, the lower thin metal plate 122 and upper thin metal plate 123 rupture from an easily ruptured part 122a formed in a C shape as a thin wall, and the abnormal internal pressure is released to the outside. The gas inside the battery released by the rupture of the lower thin metal plate 122 and upper thin metal plate 123 is released to the outside because of the exhaust holes 118a formed in the inner cap 118 and the exhaust holes 136 formed in the outer cap 124, and battery destruction is prevented. The exhaust holes 118a and 136 are oriented in directions perpendicular to the direction of gas release blowout discharge, and the battery is protected from the danger of blowing out under the force of gas discharge.

Moreover, when the temperature rises due to self-heating by excessive currents caused by shorting in the secondary battery F, and a prescribed critical temperature is reached, the resistance value of the PTC element 121 rises abruptly and thereby restricts the discharge of excessive current, preventing battery damage.

The protective circuit constructed on the circuit board 110, when the voltage and excessive discharge current occurring with overcharging or over-discharging have been detected by the control circuit 150, turns the FET 152 off, interrupts the conducting circuit, and protects the secondary battery F from overcharging, over-discharging, and excessive discharge current.

The thermistor 112 is connected to the negative terminal connecting conductor pattern 132 connected by the through holes 140 to the IC heat-radiating conductor pattern 134 whereon the IC component 105 is mounted, and is mounted on the opposite surface from the IC component 105. Hence the resistance value thereof is changed by heat conveyed from the IC component 105, and changes in that resistance value can be detected by the temperature detector terminal 103. The negative terminal connecting conductor pattern 132 to which the thermistor 112 is joined is connected to the battery case 15 through the outer cap 120. Hence the resistance value thereof is changed by heat conveyed from the battery case 15, or the secondary battery F, and changes in that resistance value can be detected by the temperature detector terminal 103. Thus, the temperature of the IC component and the secondary battery F can be detected from the temperature detector terminal 103. Accordingly, when for example a charger contacts and conducts with the temperature detector terminal 103 and charging is performed while detecting the temperature, the condition of the secondary battery F can be known from the temperature, and charging can be conducted and controlled within a prescribed temperature range.

When a protective circuit is installed inside the battery, as in the construction of the embodiments described in the foregoing, it becomes possible to provide functions for blocking excessive discharge currents by the construction of the electronic circuit. Hence, the building in of the PTC element 121 responsible for the function of blocking excessive discharge currents caused by shorts and the like can be abolished. That is, because the electronic circuit has a function for detecting excessive currents, and the conducting circuit is interrupted when such are detected, it becomes possible to do away with the PTC element 121. The PTC element 121 can be abolished with good results, without bringing about any alteration in the shape of the other constituent elements, by arranging a metal ring having the same shape and dimensions as the PTC element 121, in the same position.

Figure 34:
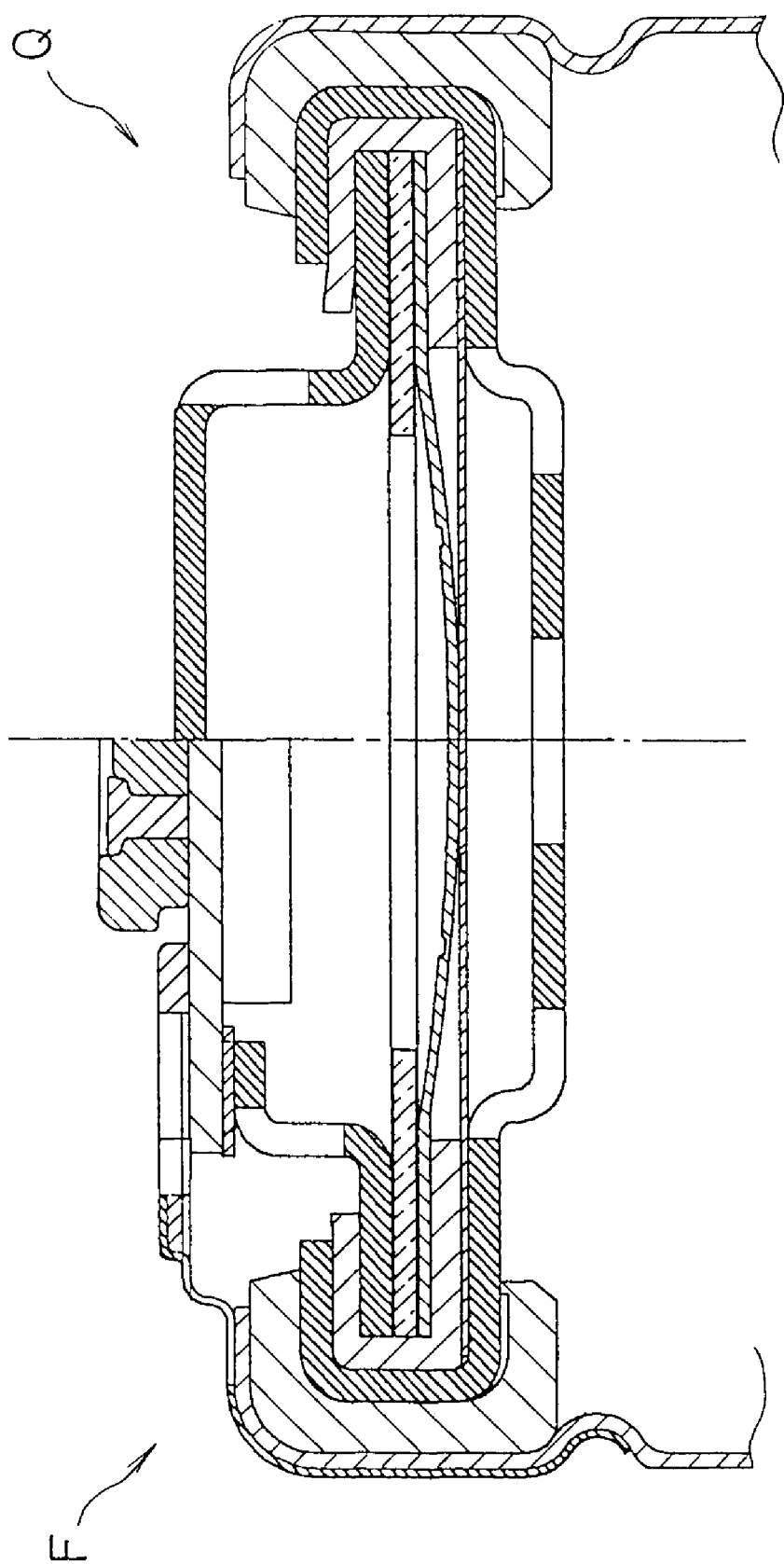
FIG. 34 is a cross-sectional diagram for comparing the secondary battery according to the seventh embodiment with a conventional secondary battery.

The construction of the embodiments described above is formed with roughly the same outer shape and dimensions as a conventional lithium ion secondary battery having no protective circuit built in. FIG. 34 represents the secondary battery F indicated in this embodiment and a conventional secondary battery Q having no built-in protective circuit, shown symmetrically on either side of a centerline. If the battery capacity is the same, the diameter and vertical dimensions will be roughly the same. Accordingly, although the battery accommodating space in the equipment using the battery power supply is the same, a construction wherein a pack battery is formed in order to configure a protective circuit as conventionally becomes unnecessary, and the battery power supply accommodating space can be reduced, which contributes to making the equipment smaller and lighter in weight.

Figure 35:
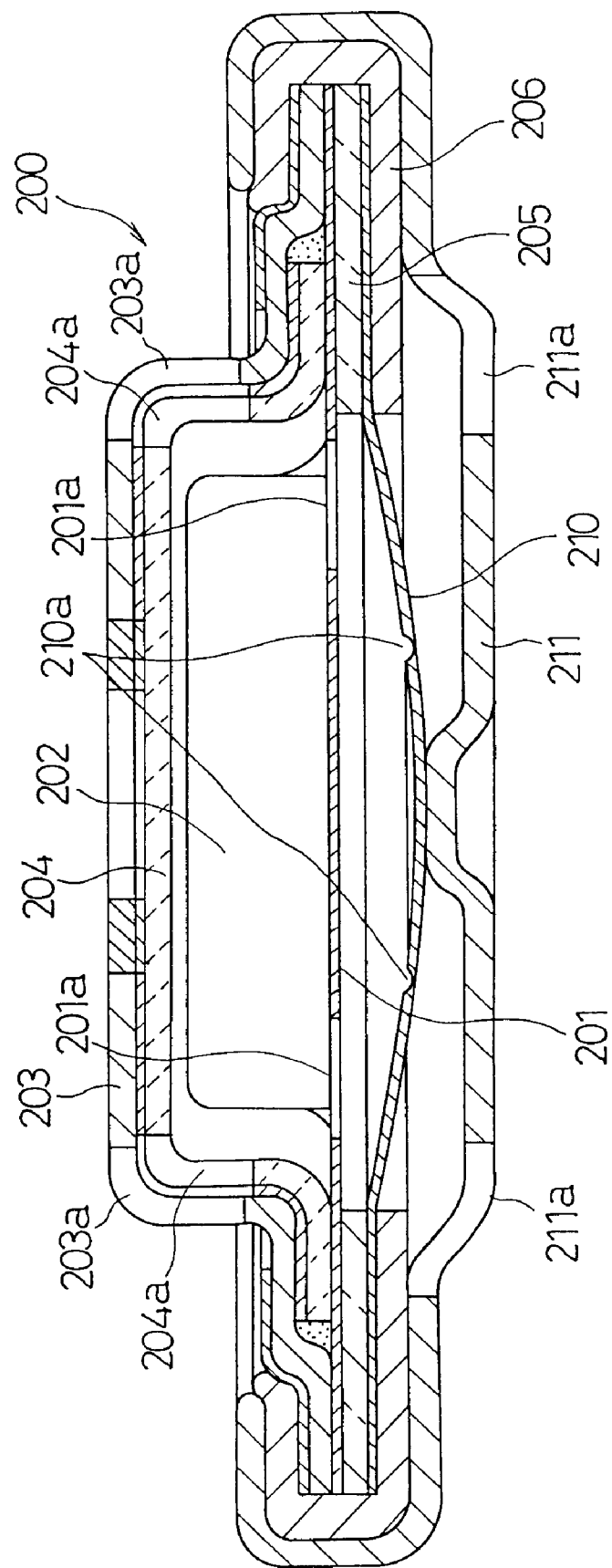
FIG. 35 is a cross-sectional representation of the construction of a sealing member in a secondary battery according to an eighth embodiment.

Next, the construction of an eighth embodiment is described. FIG. 35 diagrams the construction of a sealing member 200 in a secondary battery 220 according to the eighth embodiment. While adopting conventional structures for the built-in structures in the battery protection device, this construction is made so as to resolve the problems with the conventional construction. In FIG. 35, the sealing member 200 comprises, in order from the side of the battery interior, a sealing bottom plate 211, a thin metal plate 210 the bulging center whereof is welded to a center protrusion formed in the sealing bottom plate 211, a metal ring 205 formed in a ring shape, a flexible substrate 201 whereon is constructed an electronic circuit 202, a positive terminal cap 204 that constitutes the positive input/output terminal of the secondary battery, and an S pole cap 203 that constitutes the S pole terminal that forms the operating circuit of the electronic circuit 202 when the secondary battery is loaded in the equipment. The peripheries of these are secured, by caulking, by the peripheral portion of the sealing bottom plate 211 with in intervening inner gasket 206.

Figure 36:
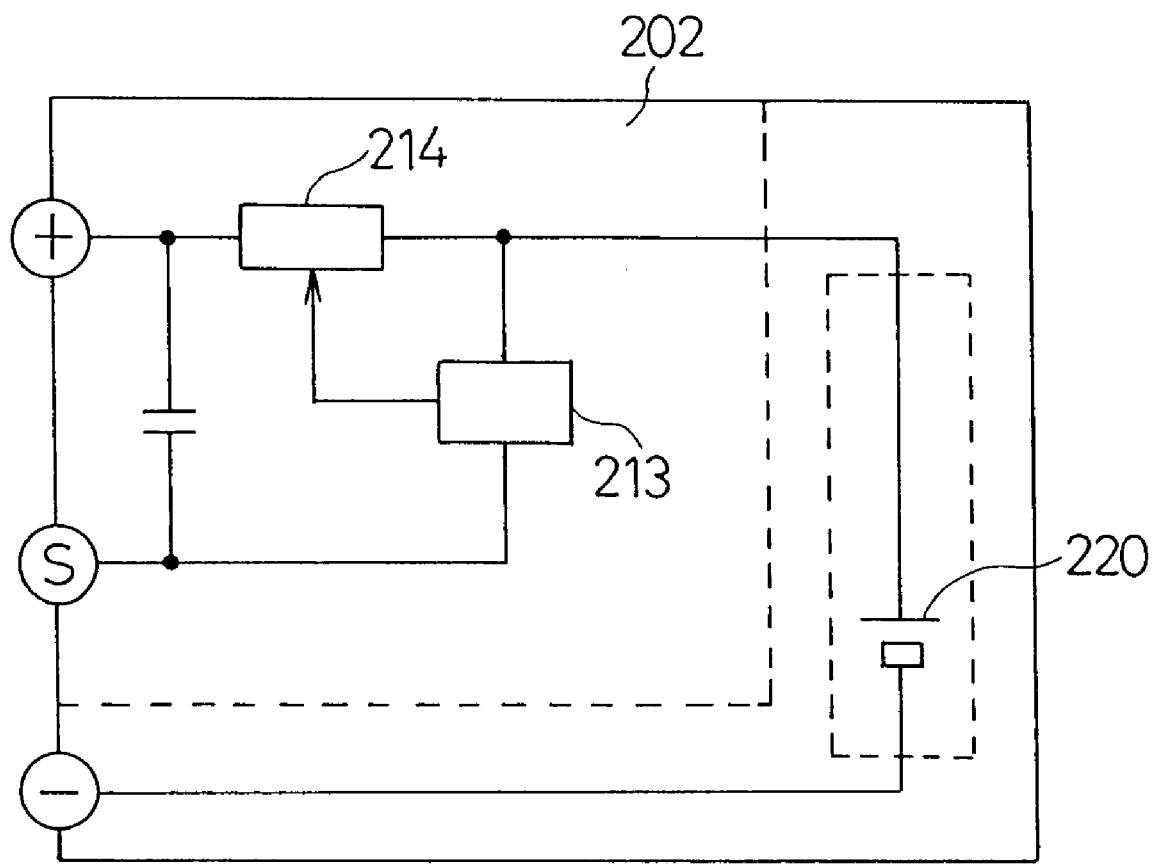
FIG. 36 is a schematic diagram of the secondary battery according to the eighth embodiment.
Figure 37:
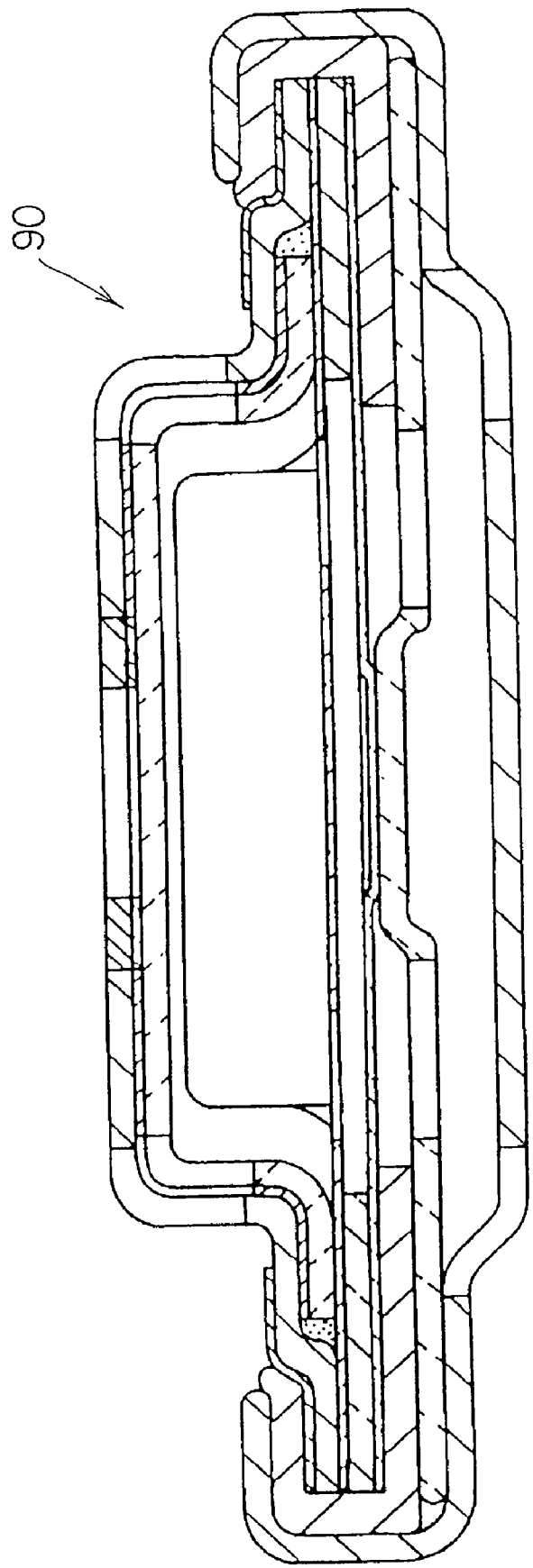
FIG. 37 is a cross-sectional representation of the construction of a sealing member in a conventional secondary battery.
Figure 38:
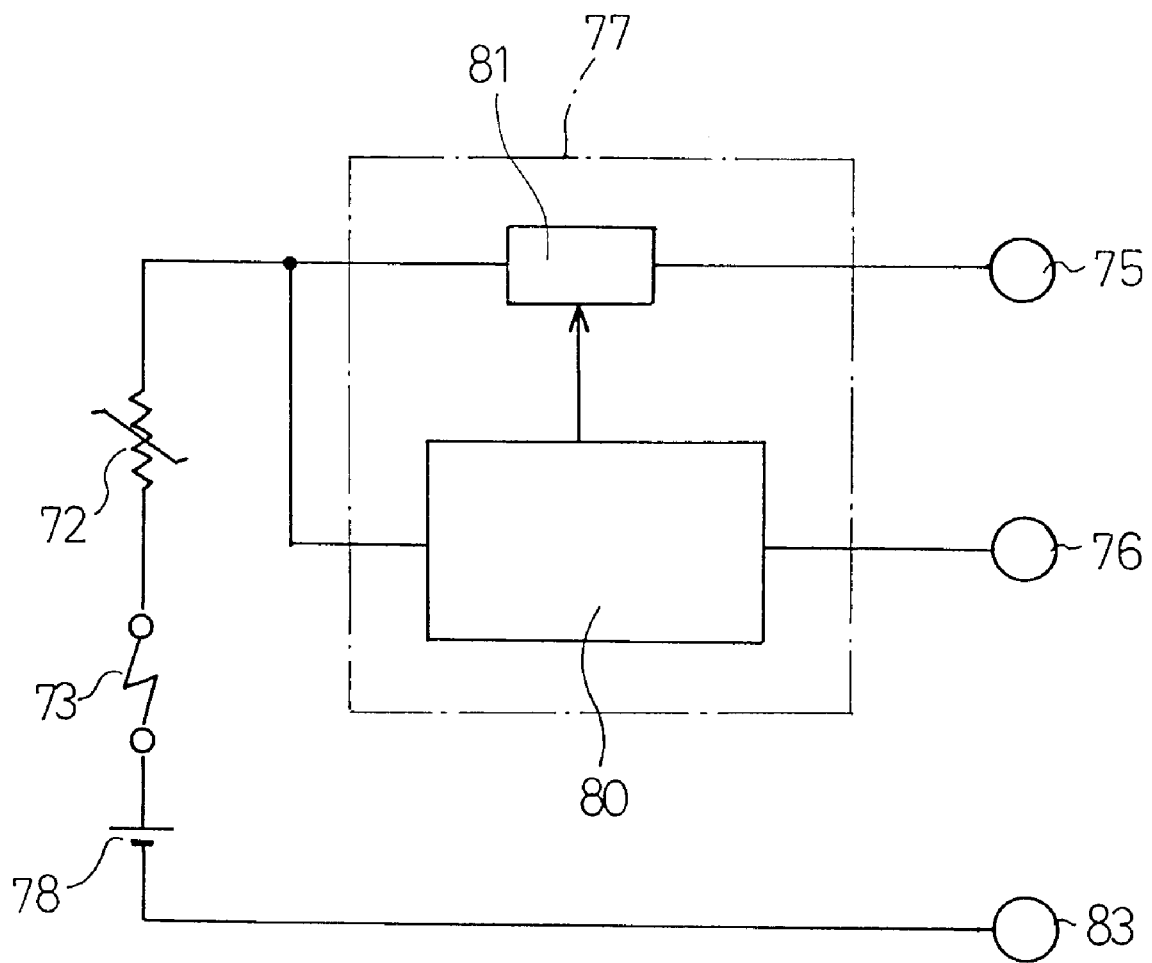
FIG. 38 is a schematic diagram for a conventional secondary battery.

The positive terminal cap 204 and the S pole cap 203, respectively, are connected to the flexible substrate 201, and, as indicated in the schematic diagram given in FIG. 36, connected to the electronic circuit 202. When the secondary battery is installed in the battery using equipment, the S pole cap 203 is connected to the battery case that becomes the negative terminal on the equipment side, thus forming the operating circuit for the electronic circuit 202. The electronic circuit 202 is constructed so that an FET 214 can be turned on and off by a control circuit 213. When an abnormal condition involving overcharging, over-discharging, or excessive currents, etc., is detected by the control circuit 213, the FET 214 is turned off to interrupt the input/output circuit. By constructing the control circuit 213 with a function for detecting excessive currents in addition to the functions for detecting overcharging and over-discharging, the PTC element required in conventional constructions becomes unnecessary. As diagrammed in FIG. 35, the metal ring 205 is arranged in place of the PTC element, thus preventing fluid leakage resulting from the caulking being loosened by the expansion of the PTC element.

The thin metal plate 210, while constituting a current interruption valve together with the sealing bottom plate 211, is also constructed as a safety valve that isolates the interior of the sealing member 200 from the interior of the battery during normal operation, but releases gas to the outside during abnormal operation. When the internal battery pressure rises abnormally, the thin metal plate 210 is deformed by that pressure, and, when the contact point with the sealing bottom plate 211 is peeled away by that deformation, the conducting circuit is interrupted. An easily ruptured part 210a is formed as a C-shaped thin wall in the thin metal plate 210. When the internal battery pressure rises further, rupture occurs from that easily ruptured part 210a and the internal pressure gas is released to the outside. Because openings 201a are formed in the flexible substrate 201 and exhaust holes 204a and 203a are formed in the positive terminal cap 204 and S pole cap 203, the gas is discharged to the outside through those holes.

Furthermore, the structure of the flexible substrate 201, positive terminal cap 204, and S pole cap 203 in this construction becomes even more beneficial, in terms of both manufacturing and function, when the constructions indicated in the first to sixth embodiments are adopted.

INDUSTRIAL APPLICABILITY

According to the present invention as described in the foregoing, a protective circuit for protecting a battery against overcharging, over-discharging, and excessive currents can be built in with a simple structure. Accordingly, a secondary battery having a built-in protective circuit can be manufactured in an assembly operation not greatly different from that for a conventional construction. Moreover, the battery can be formed in the same size as a conventional secondary battery having no built-in protective circuit. There is no need any more for a construction wherein the protective circuit is provided in the form of a pack battery, as conventionally. The battery accommodating space in the equipment using the secondary battery as a power supply can accordingly be reduced. Therefore, the present invention can advantageously be used as means for realizing both versatility and safety in a secondary battery.

What is claimed is:

1. A secondary battery having electricity generating elements accommodated inside a battery case having a bottom, an open end of said battery case being sealed with a sealing member, the sealing member having a sealing plate and a board support plate, the board support plate having an open portion and being provided outside the sealing plate, wherein
 a battery protection device is supported externally to the sealing plate and the board support plate, the battery protection device including a protective circuit for protecting said battery from overcharging, said protective circuit including an electronic circuit formed on a circuit board, said circuit board being arranged with respect to said sealing member such that an electrode terminal formed in one side thereof is exposed to the outside.

2. A secondary battery having electricity generating elements accommodated inside a battery case having a bottom, an open end of said battery case being sealed with a sealing member, the sealing member having a sealing plate and a board support plate, the board support plate having an open portion and being provided outside the sealing plate, wherein a battery protection device is supported externally to the board support plate, the battery protection device including a protective circuit for protecting said battery from overcharging, said protective circuit including an electronic circuit formed on a circuit board, said circuit board being arranged with respect to said sealing member such that an electrode terminal formed in one side thereof is exposed to the outside, and a current interruption device that interrupts a conducting circuit when internal battery voltage rises abnormally and for discharging internal voltage.

3. A secondary battery having electricity generating elements accommodated inside a battery case having a bottom, an open end of said battery case being sealed with a sealing member, the sealing member having a sealing plate and a board support plate, the board support plate having an open portion and being provided outside the sealing plate, wherein a battery protection device is supported externally to the sealing plate and the board support plate, the battery protection device including a protective circuit for protecting said battery from overcharging, said protective circuit including an electronic circuit formed on a circuit board, said circuit board being arranged with respect to said sealing member such that an electrode terminal formed in one side thereof is exposed to the outside, an excess current blocking device that blocks electrical conduction when excessive current is discharged in a short and the like, and a current interruption device that interrupts a conducting circuit when internal battery voltage rises abnormally and for discharging internal voltage.

4. The secondary battery according to claim 3, wherein said excess current blocking device comprises a PTC.

5. The secondary battery according to claim 3, wherein said protective circuit detects and blocks excessive currents, and said excess current blocking device comprises a metal ring.

6. The secondary battery according to claim 1, wherein said circuit board comprises a positive electrode terminal of said battery formed in a center portion on one surface side of the circuit board, an externally connecting electrode terminal that becomes a grounding site in said protective circuit formed in a peripheral portion on said one surface side, a positive terminal connecting electrode connecting to a positive terminal of the electricity generating elements formed in a peripheral portion of other surface side of the circuit board, and through holes provided at prescribed positions for making connections between said one surface side and said other surface side of the circuit board.

7. The secondary battery according to claim 6, wherein said electrode terminals are constructed by attaching metal plates to a conductor pattern on said circuit board by soldering or by an electrically conductive adhesive.

8. The secondary battery according to claim 6, wherein a metal plate joined to said positive electrode terminal is formed with a projection in a center portion of an outer surface thereof.

9. The secondary battery according to claim 7, wherein said metal plates are formed of nickel plate, or gold-plated metal plate, or metal plate of the same material as said battery case.

10. The secondary battery according to claim 1, wherein said circuit board is electrically connected to a positive terminal of said electricity generating elements, and is supported on an inner circumferential side of said board support plate, said board support plate being secured inside the sealing plate on an outer circumferential side thereof, such that said board support plate and a positive terminal connecting electrode make contact with each other, said board support plate and said positive terminal connecting electrode being joined together by one of solder and an electrically conductive adhesive.

11. The secondary battery according to claim 10, wherein said board support plate is formed with a projection for positioning said circuit board.

12. The secondary battery according to claim 1, wherein an electronic circuit portion of the protective circuit is coated with a resin.

13. The secondary battery according to claim 1, further comprising a conducting member for electrically connecting said battery case constituting a negative terminal of said battery and an externally connecting electrode on said circuit board.

14. The secondary battery according to claim 13, wherein said conducting member is provided with openings in a center portion and in a peripheral portion of a bottom surface and is formed in a bottomed cylindrical shape having an inner diameter that fits on the open end of said battery case.

15. The secondary battery according to claim 13, wherein said conducting member is formed of a metal material exhibiting resiliency, or a metal material exhibiting outstanding weldability with said battery case, or of the same metal material as the battery case.

16. The secondary battery according to claim 13, wherein said conducting member is formed with an insulating coating applied to a front surface excluding the peripheral portion of the bottom surface thereof.

17. The secondary battery according to claim 1, wherein the open end of said battery case, to which the sealing plate is secured by caulking, is electrically connected to a connecting member joined to an externally connecting electrode terminal.

18. The secondary battery according to claim 1, wherein a securing member and the board support plate are secured inside the sealing member on an outer circumferential side thereof with the circuit board being interposed therebetween, and said securing member and said board support plate are fastened together at a plurality of positions in a peripheral portion of said circuit board with a fastening device.

19. The secondary battery according to claim 18, wherein said fastening means are resin rivets, and ends thereof are passed through said supporting member, said circuit board, and said securing member and are melt-molded.

20. The secondary battery according to claim 18, wherein said fastening device comprises metal members, that are passed through the securing member and the circuit board with an insulating material being interposed therebetween, and are secured to the board support plate.

21. The secondary battery according to claim 1, wherein said sealing member has openings formed in prescribed constituent members of said sealing member, opening toward exterior in a direction perpendicular to direction of cylinder of said battery case.

22. The secondary battery according to claim 1, wherein said battery case has a surface thereof given an insulation coating, leaving an exposed surface larger than outer dimensions of a positive electrode terminal in a center portion of the bottom surface thereof, and an exposed surface at a prescribed circular place in a lateral circumferential surface thereof.

23. The secondary battery according to claim 1, wherein said battery case has a recessed part having a diameter larger than external dimensions of a positive electrode terminal formed in a center portion of the bottom surface thereof.

24. A secondary battery having electricity generating elements accommodated inside a battery case having a bottom, an open end of said battery case being sealed with a sealing member, the sealing member having a sealing plate and a board support plate, the board support plate having an open portion and being provided outside the sealing plate, wherein a battery protection device is supported externally to the sealing plate and the board support plate, the battery protection device including a protective circuit for protecting the battery from overcharging, said battery protection device being arranged in an outermost part of said sealing member;

a positive input/output terminal connected via said protective circuit to a positive terminal plate is joined to an outer surface side of said circuit board, in a center portion thereof; and an outer cap which covers a peripheral portion of said circuit board fits onto said battery case and is joined thereto.

25. The secondary battery according to claim 24, wherein a temperature detector terminal is provided on the outer surface side of said circuit board, and a temperature detector element, connected thereto, is provided for detecting temperature of said protective circuit and battery.

26. The secondary battery according to claim 24, wherein said sealing member comprises a current interruption means formed in a disk shape, a PTC formed in a circular ring shape, and an inner cap formed in a cap shape open at a center portion thereof, having respectively stacked outer peripheries thereof sandwiched and secured by an outer peripheral portion of a sealing bottom plate with an intervening inner gasket;

said protective circuit is provided by joining a spot ring attached to said circuit board to the apex of said inner cap; and said sealing member is secured by caulking to the open end of said battery case with an intervening outer gasket.

27. The secondary battery according to claim 26, wherein said spot ring is attached to said circuit board by joining a ring-shaped surface thereof to a conductor pattern formed on said circuit board, and said circuit board is secured on said inner cap by joining a joining surface of the spot ring made to project farther out than said circuit board from said ring-shaped surface of the spot ring to said inner cap.

28. The secondary battery according to claim 26 wherein said spot ring is formed of a copper-nickel alloy or of a clad metal containing a copper-nickel alloy.

29. The secondary battery according to claim 25, wherein:

said circuit board has an IC component mounted on an IC heat-radiating conductor pattern formed on an inner surface side thereof;

a negative terminal connecting conductor pattern formed on an outer surface side of the circuit board, to which said outer cap is joined, and said IC heat-radiating conductor pattern are connected by through holes; and said temperature detector element is arranged between said negative terminal connecting conductor pattern and a temperature detector terminal connecting conductor pattern.

30. The secondary battery according to claim 29, wherein said circuit board has a solder resist applied at prescribed sites excluding critical parts thereof;

said solder resist is applied at a position where an IC component is mounted on said IC heat-radiating conductor pattern, in a condition wherein a plurality of island patterns are arrayed; and said IC component is mounted by bonding to said island patterns so that intervals in island solder resist array are filled with adhesive.

31. The secondary battery according to claim 30, wherein said island-shaped solder resist is arrayed with sides of hexagonal island patterns in parallel at a prescribed interval.

32. The secondary battery according to claim 24, wherein a temperature detector terminal and said positive input/output terminal are formed in a metal part wherein said temperature detector terminal in center thereof and positive input/output terminal formed so as to surround said temperature detector terminal at an interval are coupled and integrated by a thin bridge by metal molding, the interval between said temperature detector terminal and said positive input/output terminal being filled with an insulating resin to join both together, after which said bridge is cut away to form a coupled and integrated complex terminal.

33. The secondary battery according to claim 32, wherein said temperature detector terminal has the apex thereof at a lower position than said positive input/output terminal.

34. The secondary battery according to claim 24, wherein said outer cap is formed of a metal material as a bottomed cylinder comprising a cylindrical part that fits onto a circumferential side surface of said battery case and a bottom surface part open in a center portion thereof;

on said bottom surface part of the outer cap, negative terminal connecting pieces that connect to a negative terminal connecting conductor pattern formed on said circuit board, board clamping pieces that press against an outer surface side of said circuit board, and upper surface pieces, positioned at a lower height than said board clamping pieces, are formed; and a resin molded part that covers the outer surface side of said circuit board excluding said temperature detector terminal and said positive input/output terminal is formed such as to expose said negative terminal connecting pieces and said upper surface pieces.

35. The secondary battery according to claim 34, wherein a ring-shaped rib is formed in said resin molded part.

36. The secondary battery according to claim 34, wherein said outer cap is formed of a copper-nickel alloy or of clad metal containing a copper-nickel alloy.

37. The secondary battery according to claim 24, wherein said protective circuit detects and blocks excessive currents, and said sealing member comprises a metal ring.

* * * * *

UNITED STATES PATENT AND TRADEMARK OFFICE
CERTIFICATE OF CORRECTION

PATENT NO. : 6,524,739 B1
DATED : February 25, 2003
INVENTOR(S) : Y. Iwaizono et al.

It is certified that error appears in the above-identified patent and that said Letters Patent is hereby corrected as shown below:

<u>Title page,</u>
Item [22], PCT Filed, "August 25, 1998" should be -- August 25, 1999 --.

Signed and Sealed this

Twenty-sixth Day of August, 2003

JAMES E. ROGAN
*Director of the United States Patent and Trademark Office*